(12) United States Patent
Otake et al.

(10) Patent No.: US 6,240,674 B1
(45) Date of Patent: Jun. 5, 2001

(54) SEEDLING RAISING SHEET, METHOD OF MANUFACTURING SAME, SEEDLING RAISING METHOD, CULTURING METHOD, AND TRANSPLANTER

(75) Inventors: Tsuneo Otake; Yasumi Fukuzumi, both of Saitama; Tsuneo Onodera; Yoshiaki Watanabe, both of Miyagi; Shigetaka Isoyama; Masashi Numabe, both of Saitama, all of (JP)

(73) Assignees: Honda Giken Kogyo Kabushiki Kaisha, Tokyo; Kabushiki Kaisha Paddy Kenkyusho, Miyagi; Kabushiki Kaisha Toyo Quality One Corporation, Tokyo, all of (JP)

( * ) Notice: Subject to any disclaimer, the term of this patent is extended or adjusted under 35 U.S.C. 154(b) by 0 days.

(21) Appl. No.: 08/930,602
(22) PCT Filed: Feb. 28, 1997
(86) PCT No.: PCT/JP97/00610
§ 371 Date: Aug. 11, 1998
§ 102(e) Date: Aug. 11, 1998
(87) PCT Pub. No.: WO97/31522
PCT Pub. Date: Sep. 4, 1997

(30) Foreign Application Priority Data

Mar. 1, 1996 (JP) .................................................. 8-045186
Oct. 14, 1996 (JP) .................................................. 8-270502

(51) Int. Cl.[7] ........................................................ A01C 1/04
(52) U.S. Cl. ................................................................ 47/56
(58) Field of Search ........................ 47/56, 58.1, 1.01 R; 111/100, 114, 199, 200

(56) References Cited

U.S. PATENT DOCUMENTS

| | | | |
|---|---|---|---|
| 2,571,491 | * 10/1951 | Schindler | 47/56 |
| 3,294,045 | 12/1966 | Kelley et al. . | |
| 3,385,242 | 5/1968 | Chancellor . | |
| 3,719,158 | 3/1973 | Roths | 111/2 |
| 3,906,875 | 9/1975 | Kesinger et al. . | |
| 4,167,910 | 9/1979 | Pretzer | 111/3 |
| 4,866,879 | 9/1989 | Wood et al. . | |
| 4,910,911 | * 3/1990 | Ahm | 47/56 |
| 5,088,231 | * 2/1992 | Kertz | 47/1.01 |

FOREIGN PATENT DOCUMENTS

| | | | |
|---|---|---|---|
| 38 04 357 | * 9/1998 | (DE) | 47/56 |
| 0 056 687 | * 7/1982 | (EP) | 47/56 |

(List continued on next page.)

OTHER PUBLICATIONS

Patent Abstracts of Japan vol. 014, No. 306, Jul. 3, 1990 & JP 03 104208 A.
Patent Abstracts of Japan, vol. 096, No. 003, Mar. 29, 1996 & JP 08–289025 A, Nov. 7, 1995.
Patent Abstracts of Japan, vol. 018, No. 392 (C–1228), Jul. 22, 1994 & JP 06–113609 A, Apr. 26, 1994.

Primary Examiner—Michael J. Carone
Assistant Examiner—Jeffrey L. Gellner
(74) Attorney, Agent, or Firm—Arent Fox Kintner Plotkin & Kahn, PLLC

(57) ABSTRACT

A seed top of foamed cells is constructed such that a porous sheet having open cells is affixed to one surface of a thin support band extending in a band-like configuration with its widthwise direction being an up-and-down direction, and accommodation recesses for accommodating seedling seeds are provided in the porous sheet. It is possible to reduce the size and weight of the seedling raising sheet used for raising seedlings and to eliminate the need for soil in raising seedling, thereby enabling an industrial mass-production of the seedling raising sheet.

20 Claims, 21 Drawing Sheets

FOREIGN PATENT DOCUMENTS

| | | | | |
|---|---|---|---|---|
| 0 097 735 | * | 1/1984 | (EP) | 47/56 |
| 2 284 877 | | 10/1988 | (EP) . | |
| 1094995 | * | 5/1955 | (FR) | 47/56 |
| 2 605 178 | * | 4/1988 | (FR) | 47/56 |
| 2 707 832 | * | 1/1995 | (FR) | 47/56 |
| 1165543 | * | 10/1969 | (GB) | 47/56 |
| 2169482 | * | 7/1986 | (GB) | 47/56 |
| 50-57808 | | 5/1975 | (JP) . | |
| 4-11818 | * | 1/1992 | (JP) | 47/56 |
| 6-343346 | | 12/1994 | (JP) . | |
| 7-7383 | | 2/1995 | (JP) . | |
| 7-289024 | | 11/1995 | (JP) . | |
| 8-214700 | | 8/1996 | (JP) . | |

* cited by examiner

SEEDLING RAISING SHEET, METHOD OF MANUFACTURING SAME, SEEDLING RAISING METHOD, CULTURING METHOD, AND TRANSPLANTER

BACKGROUND OF THE INVENTION

1. Field of the Invention

The present invention relates to a seedling raising sheet appropriately used in raising seedlings of paddy, a process for producing the seedling raising sheet, a seedling raising process and a cultivating process using the seedling raising sheet, and a transplanter using the seedling raising sheet.

2. Description of the Related Art

There Is a seedling raising sheet disclosed in Japanese Patent Application Laid-open No. 50-57808, wherein a large number of paper cylinders are bonded together to produce an assembly, so that rice seeds are sowed and raised in each of paper cylinders filled with soil, and after the raising, the paper cylinders are separated from one another and planted.

In the above seedling raising sheet, however, the paper cylinders are bonded together to form the assembly and hence, the assembly is bulky and is not easy to handle. In addition, since the soil is filled in each of the paper cylinders, the assembly of the paper cylinders has a relatively large weight and as a result, too much labor is required for transporting the assembly. Moreover, during filling of the soil into the paper cylinders, the soil is scattered in the surrounding and as a result, the surrounding is liable to become dirty. Further, to conduct a mechanical transplantation, it is necessary to define the relative position of the paper cylinders strictly uniformly, making it difficult to provide an industrial mass-production.

SUMMARY OF THE INVENTION

Accordingly, it is an object of the present invention to provide a seedling raising sheet, wherein the size and weight thereof are reduced, and it is unnecessary to use soil, thereby solving the above problem and enabling an industrial mass-production, a process for appropriately producing the seedling raising sheet, an appropriate seedling raising and cultivating process using the seedling raising sheet, and a transplanter a capable of appropriately transplanting seedlings by the seedling raising sheet.

To achieve the above object, according to a first aspect and feature of the present invention, there is provided a seedling raising sheet comprising a porous sheet having open cells and attached to one surface of a thin support band extending with its widthwise direction being an up-and-down direction, the porous sheet being provided with accommodating recesses for accommodating seedling seeds. Herein, the term "seedling seeds" includes seeds and germination-hastened seeds.

With such construction of the seedling raising sheet, the structure of the seedling raising sheet can be simplified, whereby the seedling raising sheet can be industrialized. In addition, in a state in which seedling seeds such as rice seeds have been in the accommodating recesses, the raising of seedlings can be carried out, thereby enabling a clean handling which does not require soil. The lightweight and simplified seedling raising sheet can be formed in a compact fashion, whereby the labor can be alleviated during transportation of the seedling raising sheet. Moreover, the raising of a large number of seedlings can be carried out at one time, leading to an industrial mass-production. The band-like seedling raising sheet is easily fed in the lengthwise direction thereof and hence, seedlings after being raised can be easily transplanted. Thus, the transplantation can be carried out without special provision of a complicated feed mechanism in a transplanter such as a rice planting machine. As a result of use of the support band extending in a band-like shape, the seedling feeding length is not varied, whereby an uniform planting of seedlings can be achieved; a trouble cannot arisen; and the generation of a stock lack can be prevented during transplantation such as a rice plantation.

According to another aspect and feature of the present invention, feeding lock portions for feeding the support band in a lengthwise direction thereof are provided in at least one row. Thus, it is possible to simplify the feed mechanism of the transplanter, to easily regulate the feeding speed of the seedling raising sheet and to prevent the generation of a stock lack to the utmost. In a case where the feeding lock portions are disposed at equal distances, the feed speed of the seedling raising sheet can be maintained substantially constant.

According to a further aspect and feature of the present invention, slits enabling the porous sheet formed into a band-like shape to be separated into a plurality of sheet pieces are provided in the porous sheet at locations substantially equally spaced apart in a lengthwise direction of the porous sheet to extend long in an up-and-down direction. Thus, it is easy to peel off the sheet pieces having seedlings from the support band, and it is possible to prevent the tangling of roots during raising of seedlings.

According to a yet further aspect and feature of the present invention, the porous sheet has a lower end protruding from a lower end of the support band. Thus, it is easy to peel off the porous sheet from the support band.

According to a yet further aspect and feature of the present invention, the porous sheet has accommodating recesses provided in an upper portion thereof. Thus, the upward growth and development of seedling seeds from the seedling raising sheet can be promoted during raising of seedlings, and almost all of the seeding seeds can be normally grown and developed, thereby preventing the generation of stock lack during transplantation to the utmost.

Further, according to another aspect and feature of the present invention, the accommodating recesses are formed into a shape which permits the attitude of seedling seeds accommodated in the accommodating recesses to be defined substantially vertically and substantially horizontally. Thus, it is possible to uniformize the direction of germination and the direction of growth and development to more normalize the raising of seedlings.

According to a further aspect and feature of the present invention, the seedling raising sheet is rolled in the raising and transplantation of seedlings. Thus, the seedling raising sheet can be formed compactly, thereby reducing the size of a seedling raising equipment and facilitating the setting of the seedling raising sheet to a transplanter.

According to a yet further aspect and feature of the present invention, the seedling raising sheet is folded in a zigzag fashion in the raising and transplantation of seedlings, so that the entire sheet assumes a rectangular shape. Thus, the seedling raising sheet can be moved in such a manner that unoccupied space produced with feeding of the seedling raising sheet is closed, thereby replenishing the seedling raising sheet, leading to a simplified structure of replenishment of seedlings on a transplanting stand.

According to a yet further aspect and feature of the present invention, the porous sheet has a claw hooking bore provided in a lower portion thereof for engagement of a transplanting claw in the transplantation. Thus, it is possible to facilitate the operation of peeling off the porous sheet from the support band.

In a process for producing a seedling raising sheet according to the present invention, a seedling raising sheet is produced by sequentially carrying out the following steps: a step of producing a continuous block of a porous material having open cells; a step of milling the block into a thickness of 3 to 10 mm to provide a porous sheet; a step bonding a support band and the porous sheet to each other; and a step of stamping the porous sheet to form at least accommodating recesses in the porous sheet.

With such producing process, the seedling raising sheet including the porous sheet bonded to the support band can be rationally produced, so that the porous sheet can be easily peeled off from the support band in the transplantation.

In a seedling raising process according to the present invention, seedlings seeds accommodated in the accommodating recesses are raised by a hydroponic culture. Therefore, the raising of seedlings is simplified and easily controlled. Thus, it is possible to simplify the construction of the seedling raising equipment to reduce the seedling raising cost and to provide an industrialization.

In a culturing process according to the present invention, the seedling raising sheet is planted directly into the ground in a state in which seedling seeds have been accommodated in the accommodating recesses in the seedling raising sheet, thereby conducting a direct sowing culture. Thus, a transplanter is nor required, and the seedling raising equipment is also required. Therefore, it is possible to provide a considerable reduce in cost and to enhance the rate of transplantation such as rice plantation.

A transplanter according to the present invention includes a transplanting stand on which a seedling raising sheet is placed, a feed mechanism for delivering the seedling raising sheet from on the transplanting stand, and a planting mechanism for peeling off the porous sheet from the support band of the seedling raising sheet delivered by the feed mechanism to plant the porous sheet into the ground. Thus, in using the seedling raising sheet, the structure of the transplanter can be simplified and reduced in size and weight and therefore, it is possible to facilitate the transplantation of seedlings and to prevent the generation of a stock lack of the planted seedlings.

The above and other objects, features and advantages of the invention will become apparent from the following description of the preferred embodiments taken in conjunction with the accompanying drawings.

BRIEF DESCRIPTION OF THE DRAWING

FIGS. 1 to 12 illustrate a first embodiment of the present invention, wherein

FIG. 1 is a side view of a seedling raising sheet;

FIG. 2 is an enlarged sectional view taken along a line 2—2 in FIG. 1;

FIG. 3 is an enlarged sectional view taken along a line 3—3 in FIG. 1;

FIG. 4 is an enlarged sectional view taken along a line 4—4 in FIG. 1;

FIG. 5 is a perspective view of a seedling raising sheet in a rolled state;

FIG. 6 is a vertical sectional view of a seedling raising equipment;

FIGS. 7A, 7B and 7C are illustrations for explaining the process of raising of a seedling starting from a seedling seed;

FIG. 8 is a graph illustrating a result of comparison of germination rates according to the present invention and the prior art;

FIG. 9 is a graph illustrating a result of comparison of seedling raising areas according to the present invention and the prior art;

FIG. 10 is a side view of a rice planting machine;

FIG. 11 is a plan view of the rice planting machine;

FIG. 12 is a schematic side view illustrating the construction of a portion of a planting mechanism;

DETAILED DESCRIPTION OF THE PREFERRED EMBODIMENTS

A first embodiment of the present invention will now be described by way of particular reference to FIGS. 1 to 12. Referring first to FIGS. 1 to 4, a seedling raising sheet $21_1$ is comprised of a thin support band $22_1$ extending with its widthwise direction being an up-and-down direction, and a porous sheet $23_1$ having open cells. The support band $22_1$ and the porous sheet $23_1$ are bonded to each other so that the porous sheet $23_1$ can be peeled off from the support band $22_1$.

The thin support band $22_1$ which may be appropriately used, includes (1) a film made of a thermoplastic resin such as a polyethylene, a polypropylene, a polyvinyl chloride, an acrylic resin, a polyurethane and the like;

(2) a film made of a thermosetting resin such as a polyester, a polyethylene terephthalate and the like;

(3) a non-woven fabric made of a long staple or a short staple of a synthetic fiber or a natural fiber, such as an acrylic fiber, a polypropylene fiber, a polyester fiber and the like;

(4) a woven fabric such as cloths made of a natural fiber and a synthetic fiber and a cloth made of mixed natural and synthetic fibers;

(5) a cellulose article such as a paper sheet or a paperboard made of Japanese paper or a machine-made paper; and (6) a biodegradable film made of lactic acid-based polyester such as a polylactic acid or an aliphatic polyester.

Moreover, when the film given in the item (1) or (2) is used, the thickness thereof is set at a level such that the raising and transplantation of seedlings are hindered, e.g., in a range of 0.05 to 1.15 mm, desirably, at 0.12 mm. When the non-woven fabric in the item (3) is used, the weight thereof is set in a range of 20 to 80 g/m$^2$, and the thickness thereof is set in a range of 0.15 to 0.8 mm, desirably, 0.2 to 0.4 mm. In this case, when the non-woven fabric is made of a natural fiber, the non-woven fabric may be properly subjected to a post-treatment depending upon the density of such natural fiber.

The porous sheet $23_1$ is formed from a soft (including semi-hard) polyurethane foam, a foam rubber and a non-woven fabric. The thickness of the porous sheet $23_1$ is set at a level such that all of seedling seeds can be accommodated in the porous sheet $23_1$, e.g., in a range of 3 to 10 mm.

Figure 1:
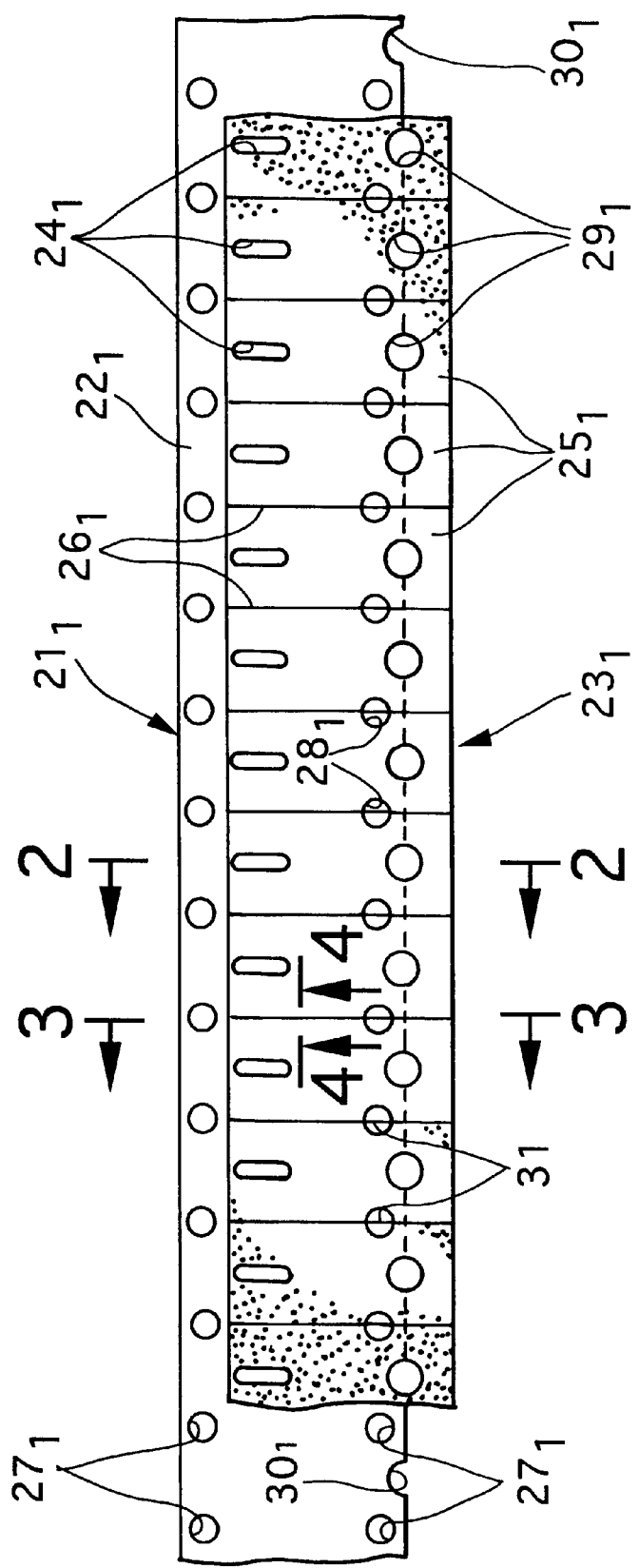
Figure 2:
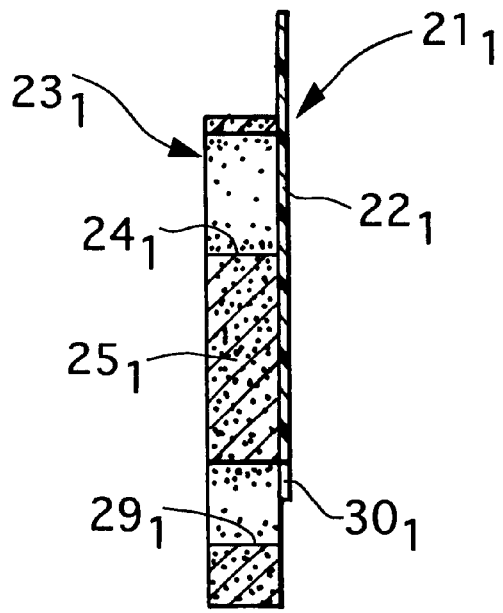
Figure 3:
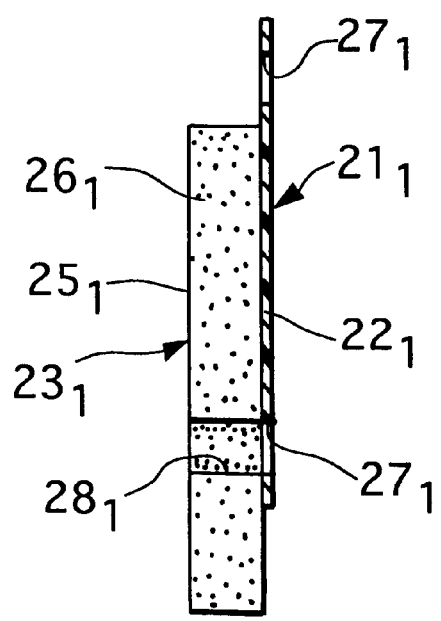
Figure 4:
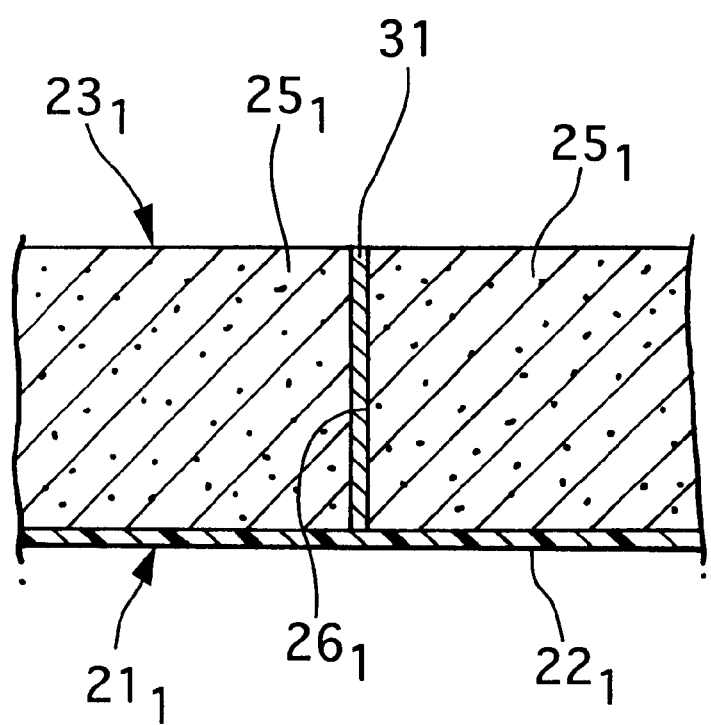

In this way, the thickness of the support band $22_1$ is set at an extremely small value with respect to the thickness of the porous sheet $23_1$, but in FIGS. 2 to 4, the support band $22_1$ is shown with its thickness emphasized for the purpose of clarifying the construction of the seedling raising sheet $21_1$.

The width of the porous sheet $23_1$ is set at the substantially same level as the width of the support band $22_1$, but the porous sheet $23_1$ is bonded to the support band $22_1$ in such a manner that a lower end thereof protrudes from a lower end of the support band $22_1$. Accommodating recesses $24_1$ for accommodating seedling seeds, e.g., rice seeds of a paddy are provided in an upper portion of the porous sheet $23_1$ at locations equally spaced apart in a lengthwise direction of the support band $22_1$ in such a manner that one surface of the support band $22_2$ serves to define closed ends of the recesses $24_1$. Each of the accommodating recesses $24_1$ is formed into a shape which substantially vertically and horizontally defines the attitude of the rice seeds accommodated in the accommodating recess $24_1$. In the first embodiment, each of the accommodating recesses $24_1$ is formed into a longitudinally-long elliptic shape with its vertical length substantially equal to or larger than the longitudinal diameter of the rice seed. Moreover, the accommodating recesses $24_1$ may be disposed in proximity to the upper end of the porous sheet $23_1$ as in the first embodiment, or may open at the upper end of the porous sheet $23_1$.

Slits $26_1$ enabling the porous sheet $23_1$ to be separated into a plurality of sheet pieces $25_1$ are provided in the porous sheet $23_1$ at locations substantially equally spaced apart in the lengthwise direction of the porous sheet $23_1$, so that each of them is located halfway between the adjacent accommodating recesses $24_1$. These slits $26_1$ may be provided in any manner, if they enable the porous sheet $23_1$ to be separated into a plurality of sheet pieces $25_1$. The slits $26_1$ may be provided to extend over the widthwise, i.e., vertically entire length of the porous sheet as in this embodiment, or may be provided partially in the widthwise direction of the porous sheet $23_1$.

Feed bores $27_1$, $27_1$ as feed lock portions for feeding the support band $22_1$ in the lengthwise direction of the latter are provided in a line in upper and lower portions of the support band $22_1$ and disposed substantially in correspondence to the slits $26_1$. Bores $28_1$ corresponding to the feed bores 27 $_1$provided in the lower portion of the support band $22_1$ are provided in a lower portion of the support band $22_1$.

Circular claw-hooking bores $29_1$ for engagement of a transplanting claw 65 (see FIG. 12) in transplantation are provided in the lower portion of the porous sheet $23_1$ at locations substantially corresponding to the accommodating recesses $24_1$, so that lower portions thereof are located below the lower end of the support band $22_1$. Moreover, semi-circular notches $30_1$ are provided in the lower end of the support band $22_1$ in correspondence to the respective claw hooking bores $29_1$.

Referring particularly carefully to FIG. 4, shielding members 31 made of paper or the like are inserted into the slits $26_1$ in such a manner that each of them demarcates the adjacent sheet pieces $25_1$, $25_1$. The shielding members 31 act to prevent the roots of seedlings raised in the adjacent sheet pieces $25_1$, $25_1$ during raising of the seedlings from growing across the slit $26_1$. The width of the slit $26_1$ in the lengthwise direction of the porous sheet $23_1$ may be relatively to increased to stop the insertion of the shielding members 31. In addition, it is conceived that the open cells are eliminated from a side of the sheet piece $25_1$ facing the slit $26_1$. Even with such a construction, it is possible to prevent the intrusion of the roots of the seedlings raised in the sheet piece $25_1$ into the adjacent sheet piece $25_1$ to simplify the plantation of the sheet piece $25_1$ having the seedlings.

In producing a seedling raising sheet $21_1$, the following steps are sequentially carried out: a step of producing a continuous block made of a porous material having open cells; a step of milling the block into a thickness of 3 to 10 mm to provide a porous sheet $23_1$; a step of bonding a support band $22_1$, and the porous sheet $23_1$ to each other; and a step of subjecting the support band $22_1$ and the porous sheet $23_1$ bonded to each other to a die-stamping to form accommodating recesses $24_1$, slits $26_1$, bores $28_1$ and claw hooking bores $29_1$ in the porous sheet $23_1$ and to form vertically two rows of feed bores $27_1$, $27_1$ and notches $30_1$ in the support band $22_1$.

When, for example, a soft polyurethane foam is selected as the porous material having open cells, it can be produced by subjecting the following components to a mixing and an agitation to perform a foaming, followed by a cross-linking: a polyol such as a polyether polyol and a polyester polyol; an organic isocyanate such as tolylene di-isocyanate, 4,4'-diphenylmetane di-isocyanate; an amine catalyst such as tri-ethylene amine; a tin catalyst such as di-butyl tin di-laurate; a foam stabilizer such as a silicone oil; and an expanding agent such as $H_2O$ and a low-boiling solvent. However, other additives may be added if required, such as a colorant, a filler and a fertilizer.

Examples of the polyol which is one of the starting materials for producing the soft polyurethane include a polyether polyol and a polyester polyol, as described above, but to produce the porous sheet $23_1$ used in the seedling raising sheet $21_1$, it is desirable that the polyether polyol is used. This is because a soft polyurethane foam produced using the polyether polyol has an increased number of closed cells and a reduced permeability and has a hydrolyzability increased as compared with that produced using the polyether polyol. Further, the density of the polyurethane foam may be in a range of 14 to 50 kg/m$^3$ which can be commonly provided. If the density is smaller than 16 kg/m$^3$, the strengths (particularly, the tensile strength and the tearing strength) are reduced, resulting in a possibility that when the transplanting claw 65 (see FIGS. 10 to 12) is hooked in the claw hooking bore $29_1$, the porous-sheet $23_1$ may be broken. If the density is equal to or larger than 35 kg/m$^3$, the diameter of the cell is too small, resulting in a possibility that the germination and the raising of seedlings may be hindered. Therefore, it is desirable that the density of the polyurethane foam is in a range of 16 to 35 kg/m$^3$.

Here, in an example of the actual production of a soft polyurethane foam, it was produced by mixing and agitating the following components to perform an expansion: 100 parts by weight of a polyether polyol having a molecular weight of 3,000, a number of functional groups of 3, an OH value of 56; 0.01 part by weight of a tolylene diamine (an amine catalyst); 0.15 parts by weight of normal ethylmorpholine; 0.12 parts by weight of di-butyl tin di-laurate (a tin catalyst); 5.5 parts by weight of water; 1.2 parts by weight of a silicone oil (a foam stabilizer); and 67 parts by weight of tolylene di-isocyanate (2.4/2.6=80/20). The physical property of the produced soft polyurethane foam is as follows: a density of 18 kg/M$^3$, a tensile strength of 1.1 kg/cm$^2$, atearing strength of 0.62 kg/cm$^2$, and an elongation of 160%.

When, for example, a non-woven fabric is selected as the porous material having open cells, a long staple and a short staple such as a polypropylene fiber and a polyethylene fiber may be interlaced and continuously formed into a predetermined length.

The block produced from the porous material having the open cells in the above manner is formed into a porous sheet $23_1$ by milling it into a thickness of 3 to 10 mm by a milling machine. In this embodiment, the porous sheet resulting from the milling into a thickness of 4.5 mm is used.

In bonding the support band $22_1$ and the porous sheet $23_1$ to each other, for example, if the support band $22_1$ is formed of a polyethylene terephthalate film and the porous sheet $23_1$ is formed of a soft polyurethane foam, then an acrylic resin-based self-adhesive is applied to one surface of either one of the support band $22_1$ and the porous sheet $23_1$ by transfer by use of a doctor roll, and both of them $22_1$ and $23_1$ are placed one on another and bonded to each other under pressure. In this case, it is desirable that portions of the opposed surfaces of the support band $22_1$ and the porous sheet $23_1$ are bonded to each other, rather than bonding of the entire opposed surfaces. Such a partial bonding makes it possible to increase the tensile strength of the porous sheet $23_1$ than a tearing force for tearing the porous sheet $23_1$ by the transplanting claw 65 (see FIGS. 10 to 12), and to reduce the force required for peeling off the porous sheet $23_1$ from the support band $23_1$ and further to reduce the tensile force acting on the support band $22_1$ when the porous sheet $23_1$ is peeled off from the support band $22_1$. Therefore, the tensile strength required by the support band $22_1$ can be set at a relatively small value.

In subjecting the support band $22_1$ and the porous sheet $23_1$ to a die-stamping, two steps of full-cutting and half-cutting are continuously carried out. First, at the full-cutting step, a laminate formed by laminating the support band $22_1$ and the porous sheet $23_1$ is disposed with the porous sheet $23_1$ being in an upper position, and is completely stamped by an edged member to form feed bores $27_1$, claw hooking bores $29_1$ and semi-circular notches $30_1$. Then, at the half-cutting step, only the porous sheet $23_1$ is stamped by another member without stamping the support band $22_1$ by such other edged member, thereby forming accommodating recesses $24_1$ and slits $26_1$ in the porous sheet $23_1$. By completing a series of the producing steps in the above manner, a seedling raising sheet $21_1$ is produced.

Figure 5:
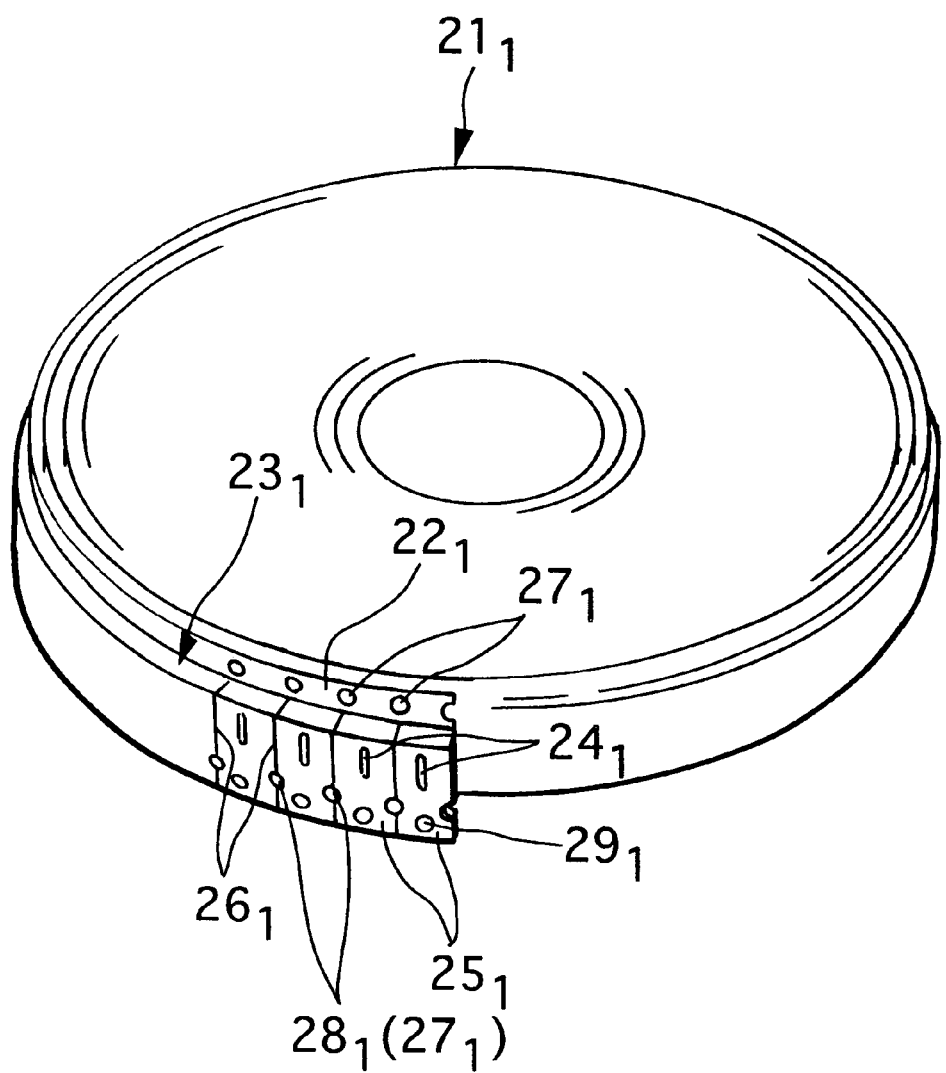

In carrying out the raising of seedling seeds by the seedling raising sheet $21_1$ produced in the above manner, a hydroponic culture is employed. For example, in the raising of seedling seeds of a paddy, rice seeds after being sowed are accommodated into the accommodating recesses $24_1$ in the seedling raising sheet $21_1$. Now, in the conventional raising of seedling seeds of a paddy, a seed sowing is carried out after a seed soaking treatment and a germination hastening treatment. On the contrast, in the raising of seedling seeds using the seedling raising sheet $21_1$ according to the present invention, any one of the seed soaking and the seed sowing may be carried out ahead of the other. For example, when the seed sowing is followed by the seed soaking, rice seeds are stored at a relatively low temperature equal or lower than about 15° C., and then, the rice seeds after being sowed are accommodated into the accommodating recesses $24_1$. Thereafter, the seedling raising sheet $21_1$ is rolled to conduct the seed soaking. In this case, the seedling raising sheet $21_1$ is rolled in such a manner that the porous sheet $23_1$ is disposed on the outer peripheral side, as shown in FIG. 5. The seedling raising sheet $21_1$ remaining rolled is soaked into water at a low temperature of about 10° C. for 10 to 15 days to perform the seed soaking treatment.

Figure 6:
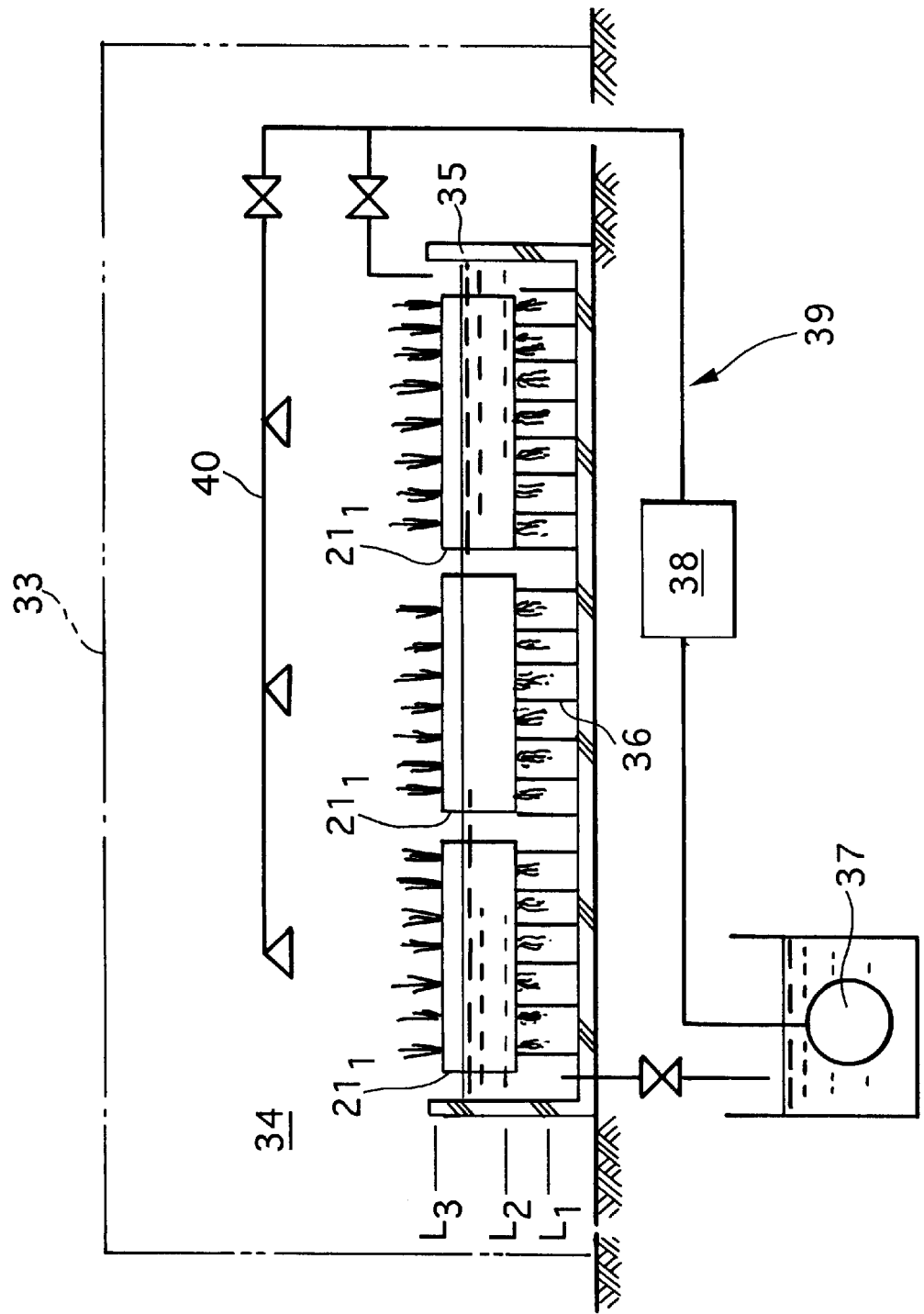
Figure 7:
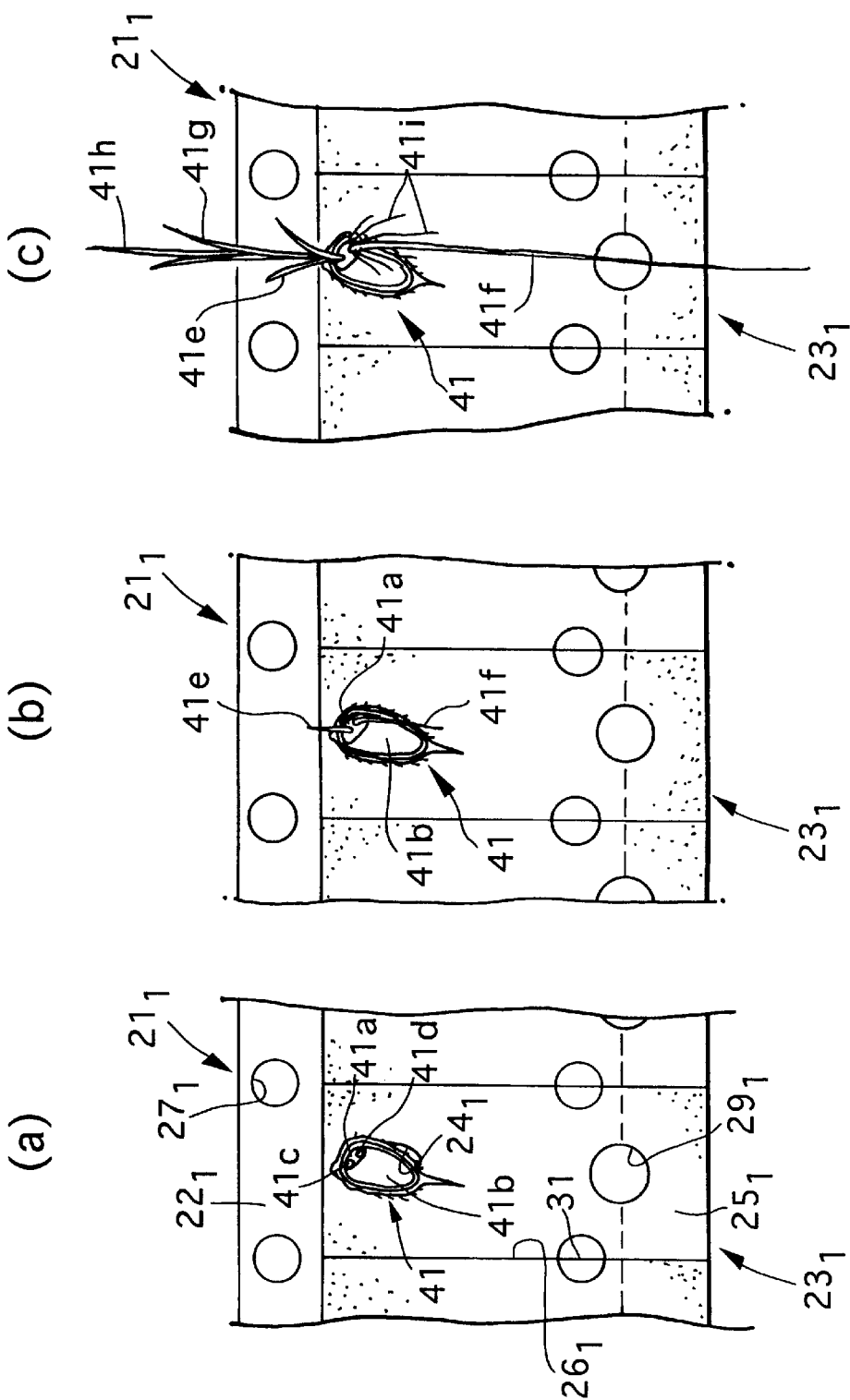

In carrying out the germination hastening treatment after the seed soaking treatment, a seedling raising equipment shown in FIG. 6 is used. More specifically, a seedling raising tank 35 is placed in a seedling raising chamber 34 within a seedling raising house 33 which is formed of a synthetic resin film or the like. The rolled seedling raising sheets $21_1$ are placed on a rest shelf 36 mounted on a bottom of the seedling raising tank 35. It is desirable that the rest shelf 36 is formed into a lattice-like shape in order to prevent roots grown downwards from the seedling raising sheets $21_2$ placed on the rest shelf 36 from tangling with one another.

The seedling raising tank 35, a circulation pump 37 and a heater 38 are connected in the named order to constitute a water circulation system 39. A spray shower device 40 diverging from the water circulation system 39 between the heater 38 and the seedling raising tank 35 is disposed for spraying water onto the seedling raising sheets $21_1$ on the rest shelf 36.

In raising seedlings in such seedling raising equipment, rice seeds 41 after being sowed are accommodated in the accommodating recesses $24_1$ in the seedling raising sheet $21_1$, with embryo 41a turned up and albumen 41b turned down, as shown in FIG. 7A, and the rolled seedling raising sheet $21_1$ is placed onto the rest shelf 36. The reason why the attitude of the rice seeds 41 is defined as described above is that an enhanced germination hastening rate is provided, and the heights of seedlings are liable to be uniformized, by the fact that a plumule 41c of the embryo 41a is disposed upwards or sideways, and a radicle 41d is disposed downwards or sideways.

Before a germination, a hydroponic liquid warmed to about 32 to 35° C. by heating by a heater is circulated in the water circulation system. For example, the hydroponic liquid is scattered from the spray shower device 40 at an interval of 5 to 8 hours. In this case, if the seedling raising sheets $21_1$ remains immersed in the hydroponic liquid within the seedling raising tank 35, the germination is hindered due to a lack of oxygen. Therefore, the level of the hydroponic liquid within the seedling raising sheets $21_1$ is set at a value $L_1$ as shown in FIG. 6, and the seedling raising sheets $21_1$ are maintained in the air at 30 to 32° C. In addition, light is not requited before the germination and hence, a light shielding treatment is applied to the seedling raising house 33.

In such a seedling raising course, sheath leaves 41e are grown upwards from the rice seeds 41, and seed roots 41f are grown upwards from the rice seeds 41, as shown in FIG. 7B.

After the germination, sprouts can take-in oxygen by breathing of leaves and hence, the seedling raising sheets $21_1$ can be immersed into the hydroponic liquid, and the level of the hydroponic liquid within the seedling raising tank 35 is set at between a level $L_2$ corresponding to a lower portion of the seedling raising sheet $21_1$ and a level $L_3$ corresponding to a top end of the seedling raising sheet $21_1$. If the hydroponic liquid level is set at below the level $L_3$, then the hydroponic liquid can be drawn up by a capillary phenomenon of the porous sheet $23_1$ in the seedling raising sheet $21_1$ and supplied to the rice seeds. If required, water may be scattered by the spray shower device 40. Moreover, after the germination, light is required and hence, the light shielding treatment for the seedling raising house 33 is canceled.

After completion of the germination from all the rice seeds, the temperature within the seedling raising house 33 is gradually lowered, so that it will reach about 20° C. at the end of the raising of seedlings, and the humidity is gradually lowered, so that the sprouts are exposed to the air. This prevents the useless unproductive growth of seedlings, thereby enabling seedlings to be grown strongly. With raising of seedlings after germination, leaves from a first leaf 41g and a second leaf 41h to a sixth leaf (not shown) are grown by a photo-synthesis or the like, as shown in FIG. 7C. Seed roots 41f are grown further long, and coronary roots 41I are sprouted from bases of the seed roots 41f.

During such raising of seedlings, it is desirable that the temperature, EC. pH and the like of the hydroponic liquid are automatically controlled. Especially, it is desirable that the pH of the hydroponic liquid is always controlled while the hydroponic liquid is being circulated, because the pH is liable to be varied.

After completion of the germination, the seedling raising sheets $21_1$ are floated from the rest shelf 36 one to three days in advance from the rice transplantation, and seed roots 41f extended downwards from the seedling raising sheets $21_1$ are cut by a cutter operated to travel, for example, between the seedling raising sheet $21_1$ and the rest shelf 36. Then, when thick active implanted roots appear from the rice seeds 41 after a lapse of 1 to 3 days from the cutting of the seed roots 41f, the rice transplantation is carried out. Thus, a good active implantation is achieved.

The purpose of soaking the rice seeds 41 is to dissolve a substance contained in a surface portion of the rice seed 41 and inhibiting the germination in water to remove the substance. To efficiently dissolve the germination inhibiting substance in the water, it is necessary to maintain a moderate temperature and a moderate humidity and to supply a sufficient amount of oxygen. An optimal temperature for a period from the germination to the budding is in a range of 30 to 32° C. In such temperature range, the seeds are germinated earliest, and the germination is best uniformized. It is generally mentioned that at a temperature lower than 30° C., sprouts are liable to fallen ill, and at a high temperature exceeding 32° C., sprouts breathe too vigorously, so that the consumption of albumen is liable to be accelerated to cause an abnormal useless and unproductive growth of seedlings to produce incense stick-like seedlings. By the raising of seedlings in the seedling raising equipment using the seedling raising sheets $21_1$ as described above, both of the lack of water and the lack of oxygen impeding the raising of rice seeds 41 can be prevented from being produced, and the germination inhibiting substance can be dissolved in the hydroponic liquid and removed off, thereby promoting an even germination and pudding.

Figure 8:
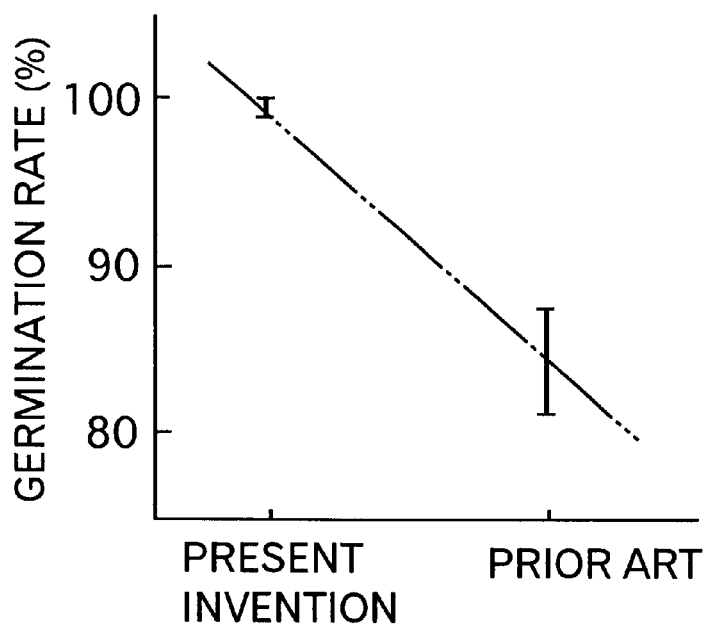

Here, a result of comparison of the germination rate in the seedling raising process according to the present invention with the germination rate in the prior art is as shown in FIG. 8. Therefore, by carrying out the raising seedlings as described above, the germination rate can be enhanced to provide an even germination and pudding and to provide an excellent subsequent growth and development.

Figure 9:
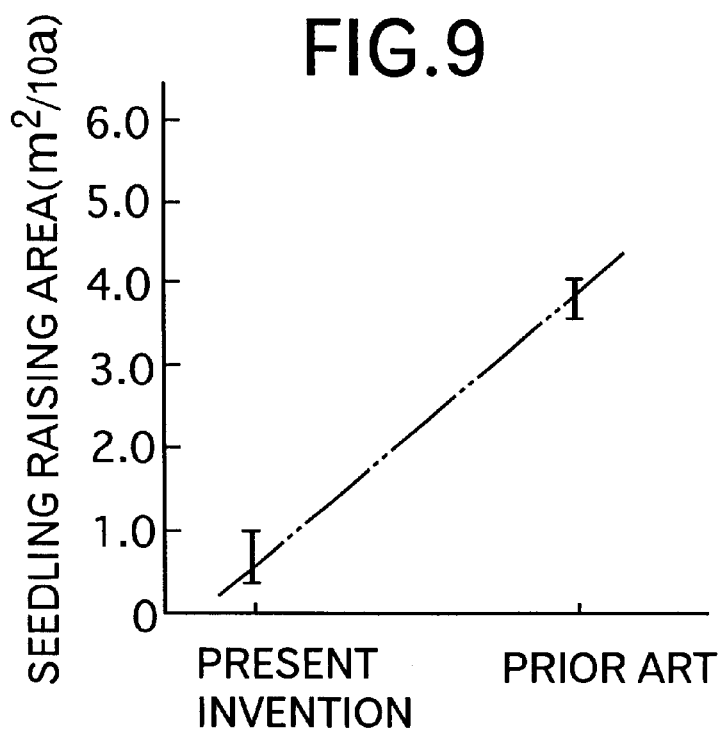

During raising of seedlings, the seedling raising sheet $21_1$ is in a compact rolled form, as shown in FIG. 5, and the raising of seedlings from a large number of rice seeds can be performed in the seedling raising sheet in this compact form. Therefore, it is possible to decrease the space required for the raising of seedlings, and as compared with the prior art, it is possible to substantially decrease the seedling raising area, as shown in FIG. 9.

Figure 10:
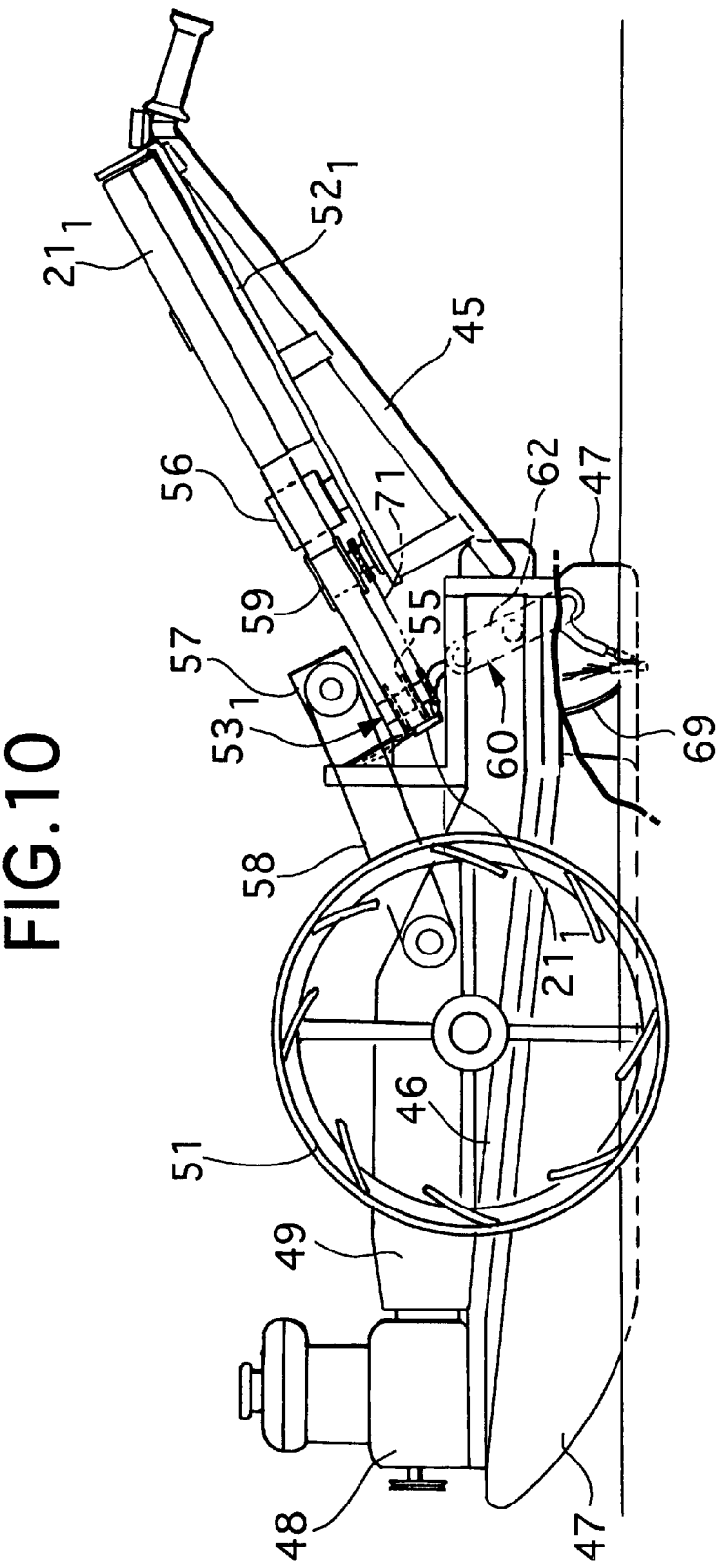
Figure 11:
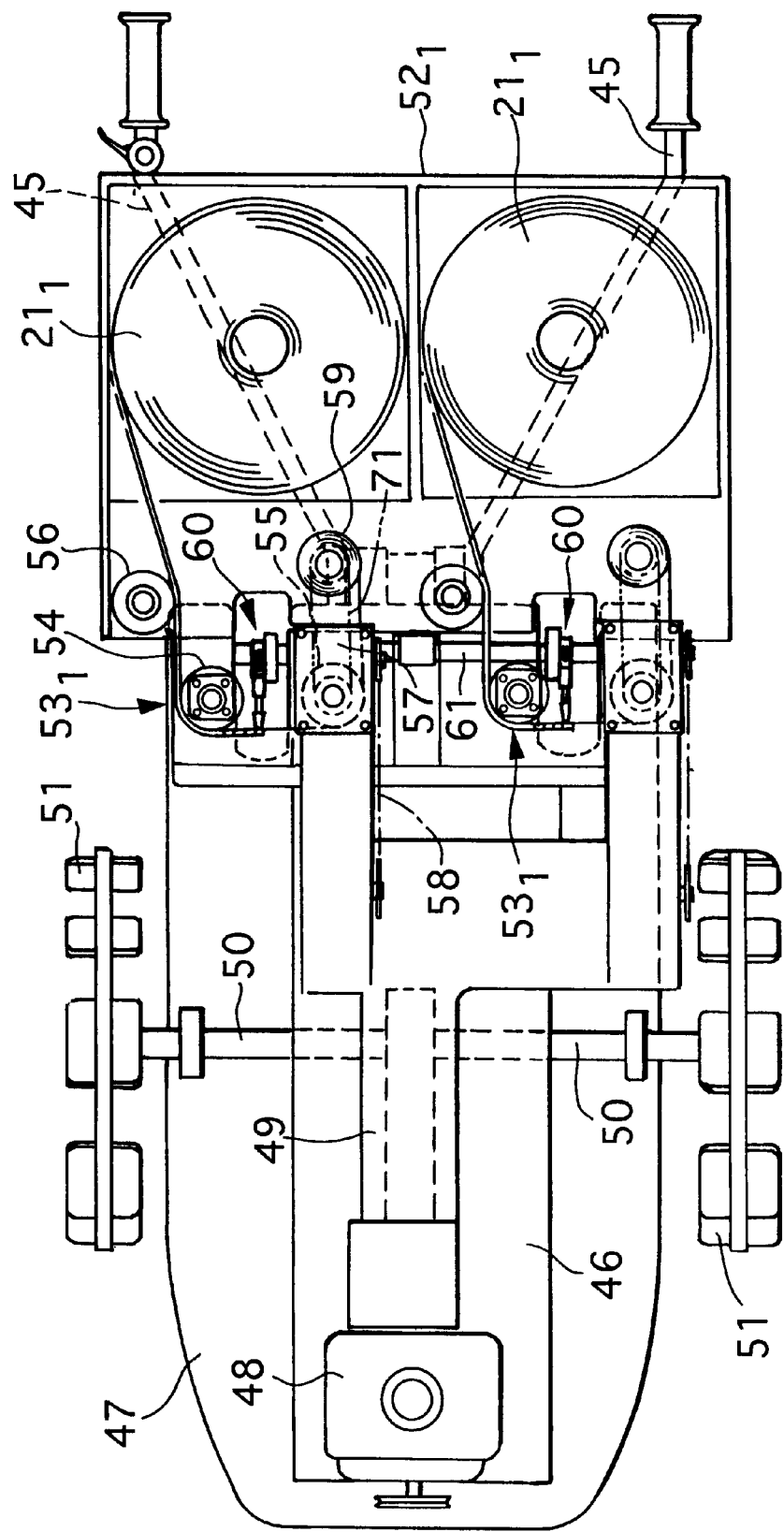

In FIGS. 10 and 11, the seedlings raised by the seedling raising sheet $21_1$ are transplanted into a rice field, for example, by a Nijo rice plating machine as a transplanter. This rice plating machine includes a machine frame 46 connected to front ends of a pair of substantially V-shaped handlebars 45, 45, and a float 47 suspended on the machine frame 46. An engine 48 is mounted on a portion of the machine frame 46 extending to above a front portion of the float 47, and a transmitting case 49 containing a transmission and a transmitting mechanism for transmitting a power from the engine 48 is disposed on the frame 46 extending longitudinally on the float 47, so that it extends rearwards from the engine 48. Moreover, rotary shafts 50, 50 protrude opposite sideways from a longitudinally middle portion of the transmitting case 49, and wheels 51, 51 are mounted at tip ends of the rotary shafts 50, 50. Thus, the power from the engine 48 is transmitted to the rotary shafts 50, 50, i.e., to the wheels 51, 51.

A transplanting stand $52_1$ is mounted between both of the handlebars 45, 45 for placement of a pair of the seedling raising sheets $21_1$, $21_1$ which are in rolled states and in which the raising of seedlings has been performed. The seedling raising sheets $21_1$, $21_1$ on the transplanting stand $52_1$ are delivered from the transplanting stand $52_1$ by a pair of feed mechanisms $53_1$, $53_1$. The feed mechanism $53_1$ includes a driving sprocket 55 meshed with the two rows of upper and lower feed bores $27_1$, $27_1$ provided in the seedling raising sheer $21_1$, a follower sprocket 54 disposed between the driving sprocket 55 and the seedling raising sheet $21_1$ in the rolled form on the transplanting stand $52_1$ and meshed with the feed bores $27_1$, $27_1$, and a tension roller 56 disposed to come into resilient contact with the outer periphery of the seedling raising sheet $21_1$ between the seedling raising sheet $21_1$ in the rolled form on the transplanting stand $52_1$ and the follower sprocket 54.

The driving sprocket 55 is rotatably supported by a gear box 57 supported on the machine frame 46 in such a manner it is disposed above the machine frame. A power taken out of the transmitting mechanism within the transmitting case 49 is transmitted through a transmitting band 58 such as an endless chain to a gear mechanism (not shown) which is contained in the gear box and connected to the driving sprocket 55. The follower sprocket 54 is rotatably supported by the machine frame 46, and the tension roller 56 is rotatably supported by the. transplanting stand $52_1$.

A support band wind-up roller 59 is disposed on the transplanting stand $52_1$ for winding up the support band $22_1$ fed by the driving sprocket 55 after peeling-off of the sheet piece $25_1$, i.e., the porous sheet $23_1$. A rotative power of the driving sprocket 55 is transmitted through an endless transmitting band 71 such as a chain to the support band wind-up roller 59.

A planting mechanism 60 for peeling off the sheet piece $25_1$ having seedlings from the support band $22_1$ of the seedling raising sheet $21_1$ fed by the feed mechanism $53_1$ to plant it is disposed in correspondence to an intermediate portion of the feed mechanism $53_1$ between the driving sprocket 55 and the follower sprocket 54.

Figure 12:
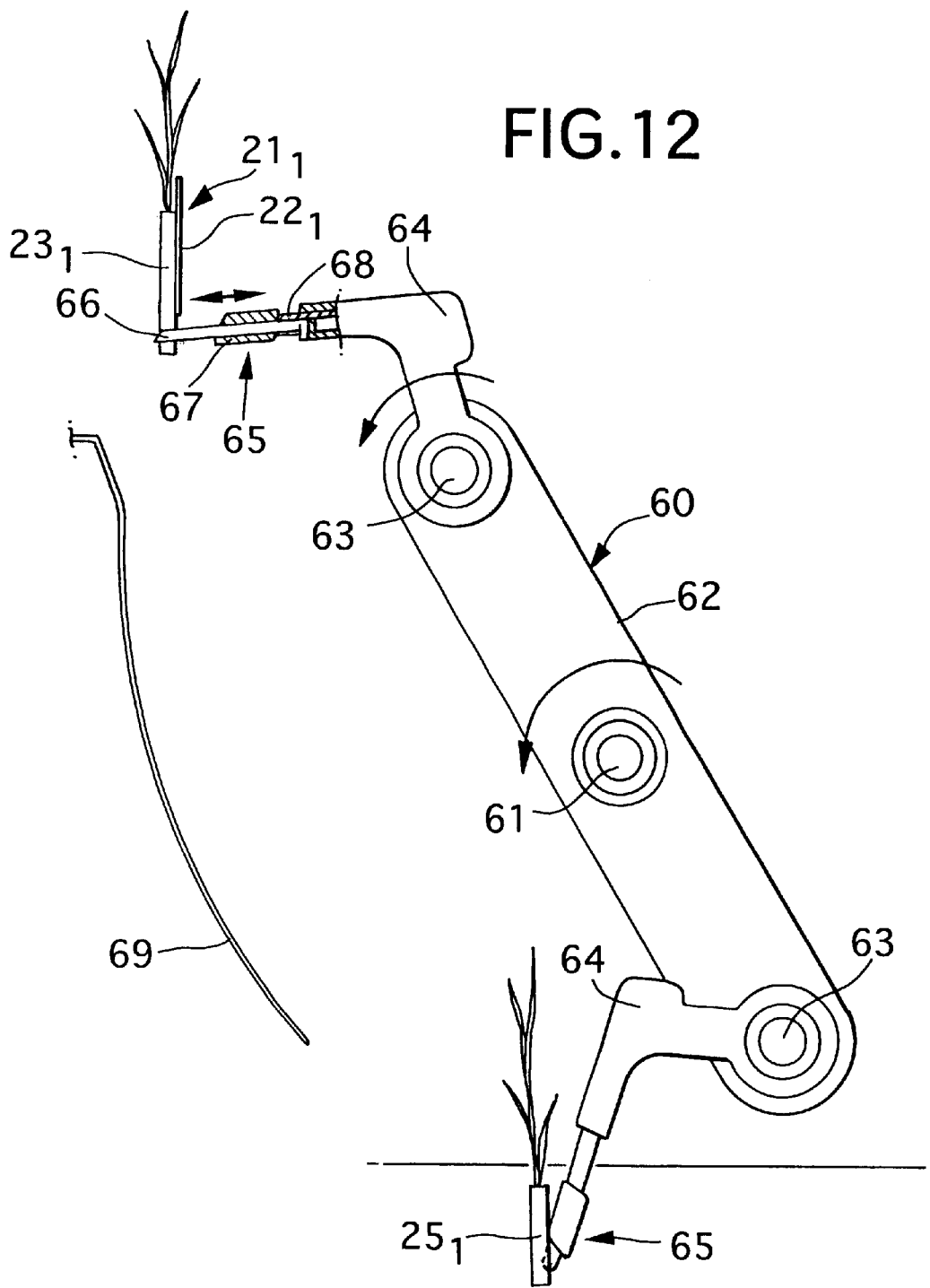

Referring also to FIG. 12, the planting mechanism 60 includes a shaft 61 which is rotatably supported at a rear end portion of the transmitting case 49 and to which the power from the engine 48 is transmitted through the transmitting mechanism (not shown) within the transmitting case 49, a claw transmitting case 62, to a central portion of which the shaft 61 is fixed, a pair of shafts 63, 63 which are rotatably supported at opposite ends of the claw transmitting case 62 and has an axis parallel to the shaft 61 and to which the power from the shaft 61 is transmitted through a transmitting mechanism (not shown) contained in the claw transmitting case 62, a pair of arms 64, 64 secured at their base ends to the shaft 63, 63, respectively, and transplanting claws 65, 65 disposed at tip ends of the arms 64, 64, respectively.

The transplanting claw 65 includes a needle 66 secured to the tip end of the arm 64, and a seedling pusher 67 mounted on the needle 66 for reciprocal movement along the needle 66. A connecting member 68 is secured to the seedling pusher 67 and inserted into the arm 64. A drive mechanism (not shown) contained in the arm 64 is connected to the connecting member 68 and operated by receiving the power from a transmitting mechanism for transmitting the power to the shaft 63. Thus, the seedling pusher 67 is reciprocally driven synchronously with the turning movement of the arm 64.

With such planting mechanism 60, the needle 66 of the transplanting claw 65 is engaged into the claw hooking bore $29_1$ in the seedling raising sheet $21_1$ fed from the follower sprocket 54 toward the driving sprocket 55 in the feed mechanism $53_1$.

When the seedlings with the sheet piece $25_1$ peeled off from the support band $22_1$ are embedded into the ground by the needle 66 by rotation of the arm 64 caused by the rotation of the shafts 61, 63, 63, the seedling pusher 67 releases the seedlings with the sheet piece $25_1$ from the needle 66 to move them in a direction to push them into ground. Thus, the seedlings with the sheet piece $25_1$ are planted.

In order to prevent the sheet piece $25_1$ from being dropped from the needle 66 in the course of carrying the sheet piece $25_1$ released from the seedling raising sheet $21_1$ and having the seedlings to the ground surface by the needle 66 of the transplanting claw 65, for example, a guide member 69 comprised of a pair of wire or rods (see FIGS. 10 and 12) is mounted to the machine frame 46 in such a manner that the sheet piece $25_1$ is guided along a moving path of the needle 66.

The seedlings retained by the seedling raising sheet $21_1$ fed by the feed mechanism $53_1$ may be detected by a sensor (not shown), and when the seedling is not detected by the detecting sensor, the speed of feeding of the seedling raising sheet $21_1$ by the feed mechanism $53_1$ may be increased.

The operation of the first embodiment will be described below. Since the porous sheet $23_1$ having open cells is bonded to one surface of the support band $22_1$ extending in a bandlike shape with its widthwise directing being vertical, so that it can be peeled off from the support band $22_1$, and the accommodating recesses $24_1$ are provided in the porous sheet $23_1$, so that the raising of seedlings is carried out in a state in which seedling seeds such as rice seeds have been accommodated, it is possible to perform a clean handling with no need for soil filling and to arrange the lightweight and simplified seedling raising sheet $21_1$ in a compact shape, thereby alleviating the labor during transportation of the seedling raising sheet.

Moreover, the raising of a large number of seedlings can be carried out at one time in the seedling raising sheet $21_1$, thereby providing an industrial mass-production, and it is easy to feed the band-like seedling raising sheet $21_1$ in the lengthwise direction thereof. Therefore, it is also easy to transplant the seedlings after being raised, and the construction of the feed mechanism $53_1$ included in the transplanter such as a rice planting machine can be simplified to perform the transplantation. In addition, as result of use of the support band $22_1$, the seedling feeding length is not varied, whereby the seedlings can be uniformly planted, and no trouble is produced with the feeding of the seedlings. For example, the generation of a stock lack can be prevented during rice-planting.

Since the seedling raising sheet $21_1$ is in the rolled state during raising of seedlings and during transplantation, the seedling raising sheet $21_1$ can be arranged in a more compact form, and the area required for raising of seedlings can be decreased. In addition, the seedling raising sheet $21_1$ can be easily transported and easily set into the transplanter such as the rice planting machine.

Additionally, since the seedling raising sheet $21_1$ is in the rolled form such that the porous sheet $23_1$ is located on the side of the outer periphery of the seedling raising sheet $21_1$, the tangling of roots grown from the rice seeds in the accommodating recesses $24_1$ can be avoided to the utmost, and the peeling-off operation is facilitated by peeling off the sheet pieces $25_1$ from the outside of the rolled seedling raising sheet $21_1$.

Further, during raising of the seedlings, the raising of the seeds and seedlings upward from the seedling raising sheet $21_1$ can be promoted by the fact that the accommodating recesses $24_1$ are provided in the upper portion of the porous sheet $23_1$. By normally raising almost all of the seeds and seedlings, the generation of a stock lack during transplantation can be prevented to the utmost. Moreover, by the fact that the upper end of the accommodating recesses $24_1$ are disposed in proximity to the upper end of the porous sheet $23_1$, or open at the upper end of the porous sheet $23_1$, the raising of seedlings and the germination (the hastening of germination) are more facilitated, and the sprout growing direction can be uniformized upwards. Further, the accommodating recess $24_1$ is formed into a longitudinally long elliptic shape for ensuring the substantially vertical attitude of the seedling seeds accommodating recess $24_1$. This also makes it possible to uniformize the direction of germination (the hastening of germination) and the direction of raising, thereby more normalizing the raising of seedlings. That is, as described with reference to FIG. 7, it is important that the plumule lies at the upper portion or the side of the rice seed, and the raising of seedlings can be normalized by defining the attitude of the seedling seeds as described above. In addition, by the fact that the slits $26_1$ for separating the porous sheet $23_1$ into the plurality of sheet pieces $25_1, 25_1$ are provided in the porous sheet $21_1$, the mutual tangling of the roots of adjacent rice seeds is inhibited to the utmost. By the fact that the shielding members 31 are inserted into the slits $26_1$, the tangling of the adjacent rice seeds is more reliably prevented; the sheet piece $25_1$ having seedlings can be easily peeled off from the support band $22_1$ by the needle 66 of the transplanting claw 65 at the time of rice planting, there by performing a normal rice planting, and assisting the raising of roots.

Moreover, by using the hydroponic culture during raising of seedlings, the raising of seedlings can be simplified and easily controlled. Further, the construction of the seedling raising equipment can be simplified by the hydroponic culture using the seedling raising sheet $21_1$, thereby reducing the seedling raising cost to provide an industrialization.

In the transplantation using the transplanter such as a rice planting machine, the feed mechanism $53_1$ of the transplanter can be simplified, and the feeding speed of the seedling raising sheet $21_1$ can be easily regulated, as well as the generation of a stock lack can be prevented to the utmost, because the feed bores $27_1$ for feeding the support band $22_1$ in the lengthwise direction are provided in the support band $22_1$ of the seedling raising sheet $21_1$.

Moreover, the feeding speed of the seedling raising sheet $21_1$ can be maintained substantially constant by the fact that the feed bores $27_1$ are arranged at equal distances. In addition, the attitude of the seedling raising sheet $21_1$ during transplantation can be maintained substantially constant, thereby smoothing the transplanting operation, by the fact that the feed bores $27_1$ are arranged in one row in each of the upper and lower portions of the support band $22_1$.

In the planting by the panting mechanism 60 of the transplanter, the needle 66 of the transplanting claw 65 in the planting mechanism 60 is brought into engagement in the claw hooking bore $29_1$ provided in the lower portion of the porous sheet $23_1$, and it is easy to peel off the sheet pieces $25_1$ having seedlings from the support band $22_1$, because the slits $26_1$ are provided at the locations spaced apart in the lengthwise direction of the porous sheet $23_1$. Moreover, it is easy to bring the needle 66 of the transplanting claw 65 into engagement in the claw hooking bore $29_1$ by the fact that the claw hooking bore $29_1$ is provided in the porous sheet $23_1$ with at least a portion thereof disposed below the lower end of the support band $22_1$. Further, since the needle 66 is brought into engagement in the claw hooking bore $29_1$ in the seedling raising sheet $21_1$ from the side of the support band $22_1$, the sheet piece $25_1$ can be easily peeled off from the support band $22_1$, and hence, the transplantation of the sheet piece $25_1$, i.e., the seedlings can be smoothly carried out. In this case, by the fact that the feed bores $27_1$ for feeding the support band $22_1$ in the lengthwise direction thereof are provided in the support band $22_1$ at the locations corresponding to the slits $26_1$ in the lengthwise direction of the support band $22_1$, the engagement of the needle 66 of the transplanting claw 65 into the feed bores $27_1$ is avoided to more reliably embed, i.e., transplant the sheet piece $25_1$ into the ground.

Figure 13:
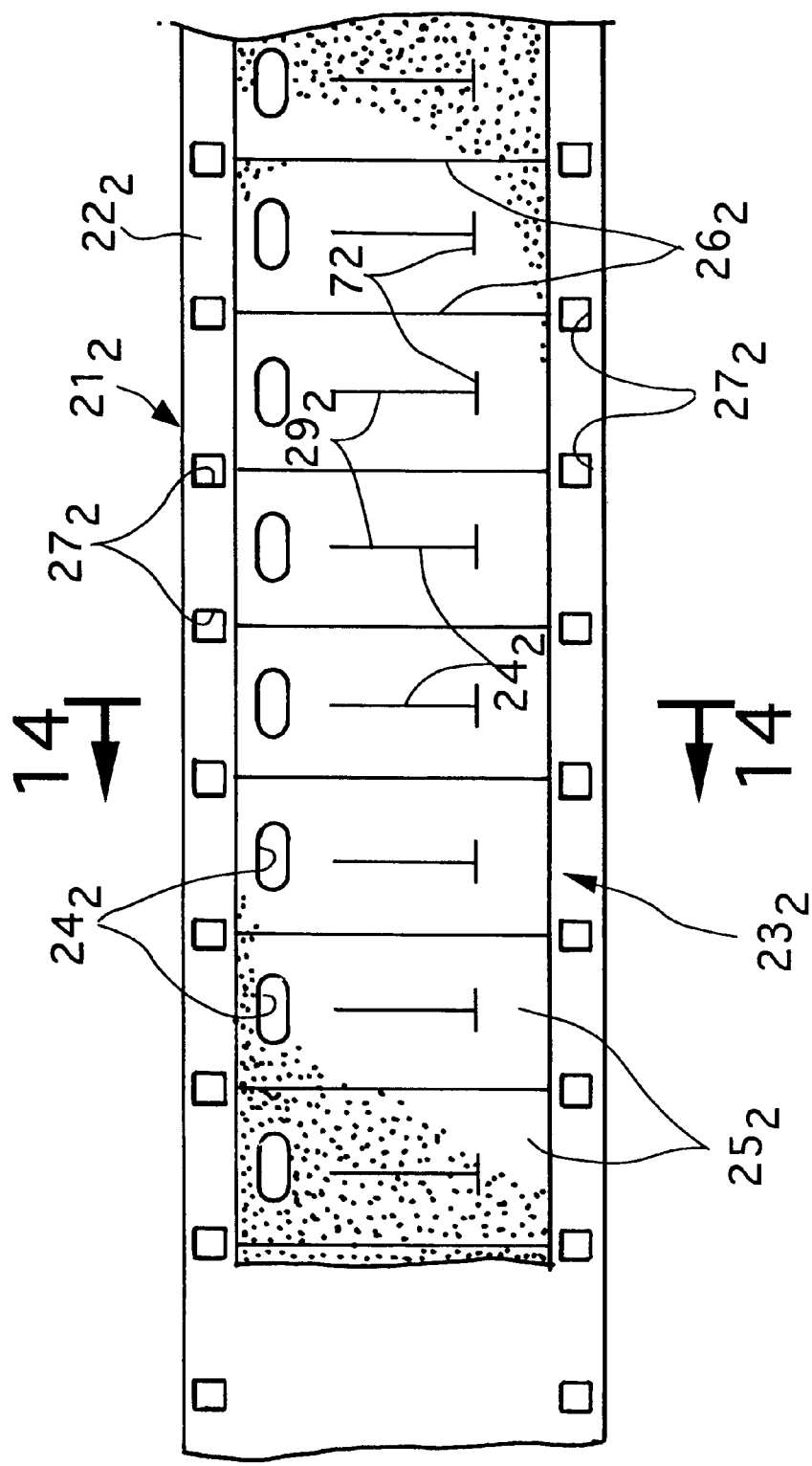
FIG. 13 is a side view of a seedling raising sheet according to a second embodiment of the present invention.
Figure 14:
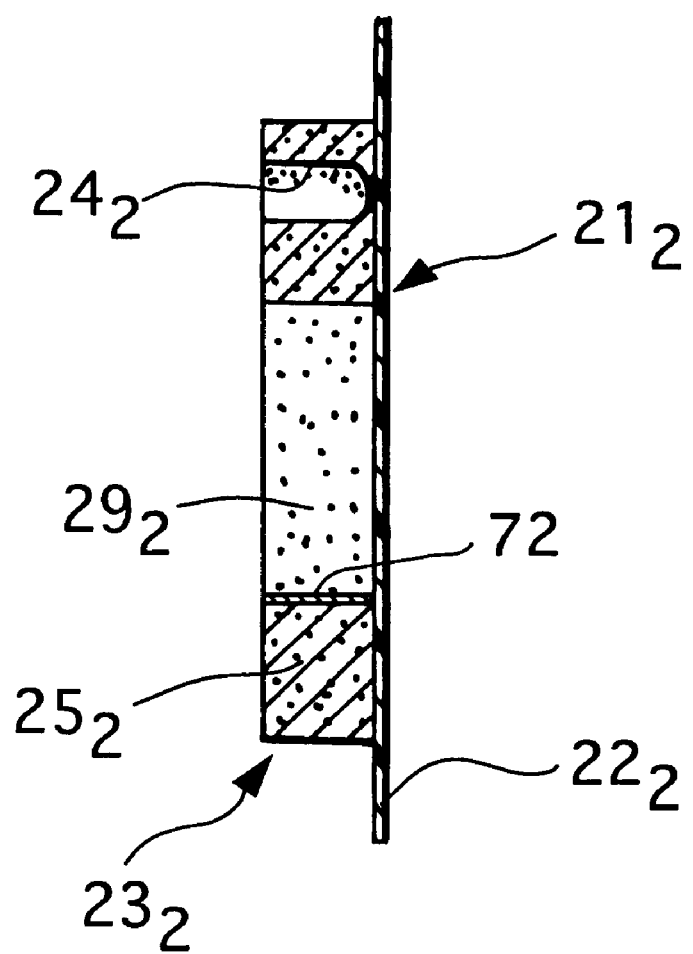
FIG. 14 is an enlarged sectional view taken along a line 14—14 in FIG. 13.

FIGS. 13 and 14 illustrate a second embodiment. FIG. 13 is a side view of a seedling raising sheet, and FIG. 14 is an enlarged sectional view taken along a line 14—14 in FIG. 13.

The seedling raising sheet $21_2$ includes a support band $22_2$ extending with its widthwise direction being vertical, and a porous sheet $23_2$ having open cells. The support band $22_2$ and the porous sheet $23_2$ are bonded to each other, so that the porous sheet $23_2$ can be peeled off from the support band $22_2$.

The porous sheet $23_2$ is formed with a width smaller than that of the support band $22_2$, and is bonded to the support band $22_2$ so that both of upper and lower portions of the support band $22_2$ are exposed to above and below the porous sheet $23_2$. Moreover, accommodating recesses $24_2$ for accommodating seedling seeds, e.g., rice seeds of a paddy are provided in an upper portion of the porous sheet $23_2$ in a substantially elliptic shape to define the attitude of the rice seeds accommodated in the accommodating recess $24_2$ substantially horizontally.

Slits $26_2$ enabling the porous sheet $23_2$ to be separated into a plurality of sheet pieces $25_2$ are provided in the porous sheet $23_2$ over the widthwise, i.e., vertically entire length of the latter at locations substantially equally spaced apart in the lengthwise direction of the porous sheet $23_2$ in such a manner that each of the slits $26_2$ is located halfway between the adjacent accommodating recesses $24_2$. In addition, feed abores $27_2$ for example, of a quadrilateral shape for feeding the support band $22_2$ in the lengthwise direction thereof are provided in one row in each of upper and lower portions of the support band $22_2$. These feed bores $27_2$, $27_2$ are disposed substantially in correspondence to the slits $26_2$.

Slit-like claw hooking bores $29_2$, for example, extending long vertically, are provided in an vertically intermediate portion of the porous sheet $23_2$ at locations substantially corresponding to the accommodating recesses $24_2$, so that the needle 66 (see FIG. 12) of the transplanting claw 65 is brought into engagement in the claw hooking bore $29_2$. A thin piece-like stoppers 72 formed by cutting a relatively hard and thin member, e.g., a tape made of a synthetic resin are mounted to lower ends of the claw hooking bores $29_2$, respectively in order to prevent the sheet piece $25_2$ from being broken when the sheet piece $25_2$ is peeled off from the support band $22_2$ by engagement of the needle 66 in the claw hooking bore $29_2$.

In the raising and transplantation of seedlings using such seedling raising sheet $21_2$, the seedling raising sheet $21_2$ is rolled with the porous sheet $23_2$ being located on the side of an inner periphery thereof. The rolling of the seedling raising sheet $21_2$ in the above manner makes it possible to prevent the dropping of seeds and seedlings from the accommodating recesses $24_2$.

In another alternate embodiment of the present invention, the vertical position of the seedling raising sheet $21_2$ in the second embodiment may be reversed, wherein the slit-like claw hooking bores $29_2$ may be used as accommodating recesses, and the elliptic accommodating recesses $24_2$ may be used as claw hooking bores. In this case, the stopper 72 is not mounted in each of the slit-like accommodating recesses, and maybe mounted in a lower portion of each of the elliptic claw hooking bores, if required.

Figure 15:
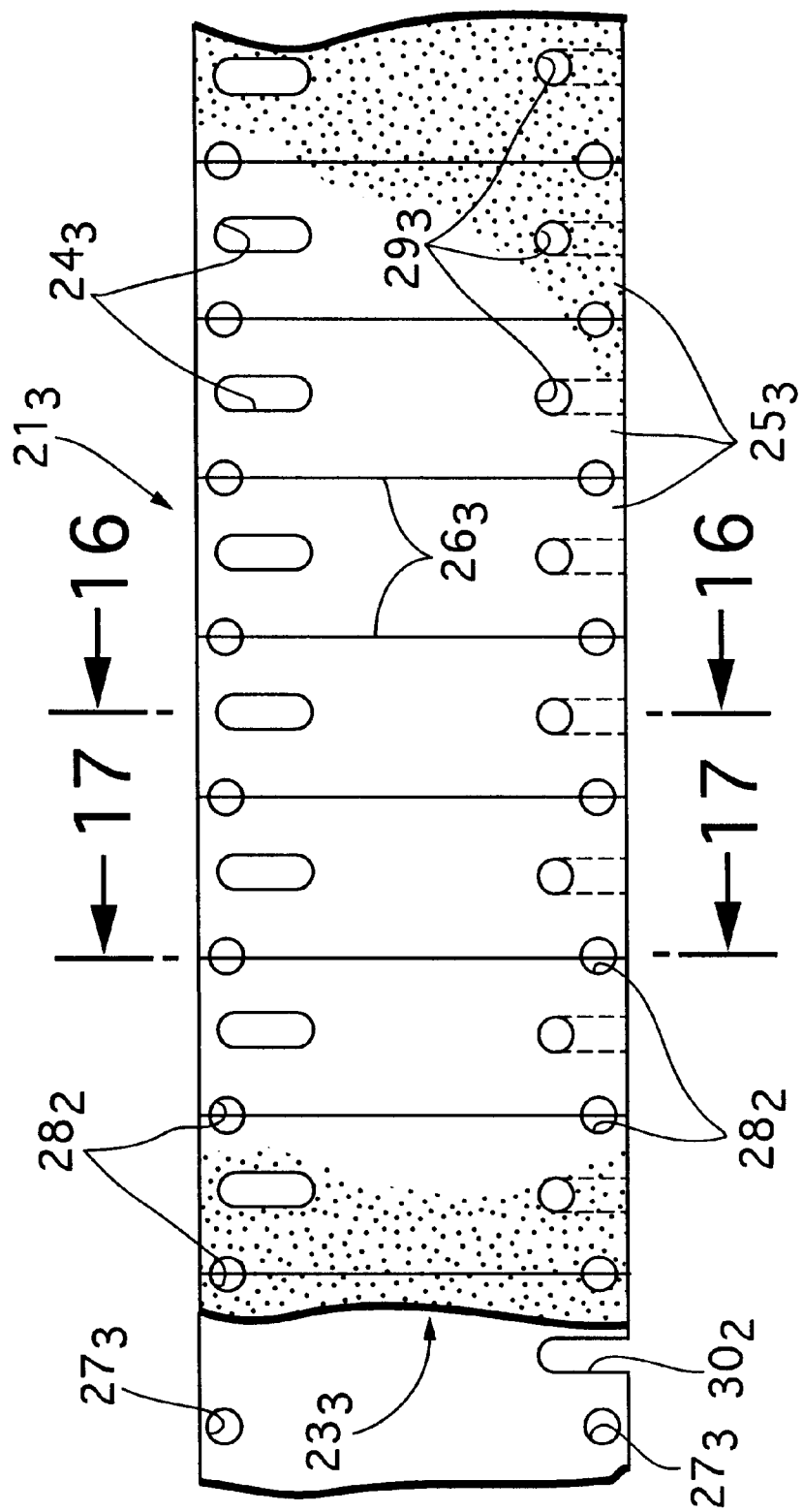
FIG. 15 is a side view of a seedling raising sheet according to a third embodiment of the present invention.
Figure 16:
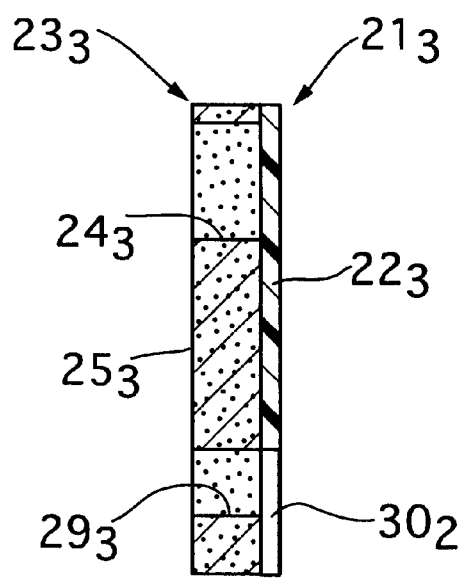
FIG. 16 is an enlarged sectional view taken along a line 16—16 in FIG. 15.
Figure 17:
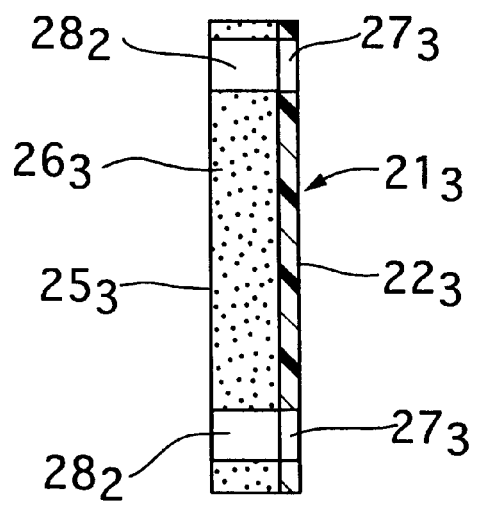
FIG. 17 is an enlarged sectional view taken along a line 17—17 in FIG. 15.

FIGS. 15 to 17 illustrate a third embodiment of the present invention. FIG. 15 is a side view of a seedling raising sheet; FIG. 16 is an enlarged sectional view taken along a line 16—16 in FIG. 15; and FIG. 17 is an enlarged sectional view taken along a line 17—17 in FIG. 15.

The seedling raising sheet $21_3$ includes a support band $22_3$ (FIG. 15) extending with its widthwise direction being vertical, and a porous sheet $23_3$ having open cells. The support band $22_3$ and the porous sheet $23_3$ are bonded to each other, so that the porous sheet $23_3$ can be peeled off from the support band $22_3$.

The porous sheet $23_3$ is bonded to the support band $22_3$ in such a manner that both of upper and lower opposite ends of the porous sheet $23_3$ are substantially matched to upper and lower opposite ends of the support band $22_3$. Moreover, accommodating recesses $24_3$ for accommodating seedling seeds, e.g., rice seeds of a paddy are provided in an upper portion of the porous sheet $23_3$ and formed into a longitudinally long elliptic shape with a longitudinal diameter substantially equal to or larger than that of rice seed accommodated in the accommodating recess $24_3$.

Slits $26_3$ enabling the porous sheet $23_3$ to be separated into a plurality of sheet pieces $25_3$ are provided in the porous sheet $23_3$ over the widthwise, i.e., vertically entire length of the latter at locations substantially equally spaced apart in the lengthwise direction of the porous sheet $23_3$ in such a manner that each of the slits $26_3$ is located halfway between the adjacent accommodating recesses $24_3$. In addition, circular feed bores $27_3$ for feeding the support band $22_3$ in the lengthwise direction thereof are provided in one row in each of upper and lower portions of the support band $22_3$ in such a manner that they correspond to the slits $26_3$. Bores $28_2, 28_2$ corresponding to the feed bores $27_3, 27_3$ provided in the upper and lower portions of the support band $22_3$ are provided in upper and lower portions of the porous sheet $23_3$, respectively.

Circular claw hooking bores $29_3$ are provided in the lower portion of the porous sheet $23_3$ at locations substantially corresponding to the accommodating recesses $24_3$, so that the needle 66 (see FIG. 12) of the transplanting claw 65 is brought into engagement in the claw hooking bore $29_2$. Notches $30_3$ are provided in the lower portion of the support band $22_3$ to extend from the claw hooking bores $29_3$ to a lower end edge of the support band $22_3$.

In the raising and transplantation of seedlings using such seedling raising sheet $21_3$, the seedling raising sheet $21_3$ is rolled with the porous sheet $23_3$ being located on the side of an inner periphery thereof. Thus, it is possible to provide an effect similar to that in the first embodiment.

Figure 18:
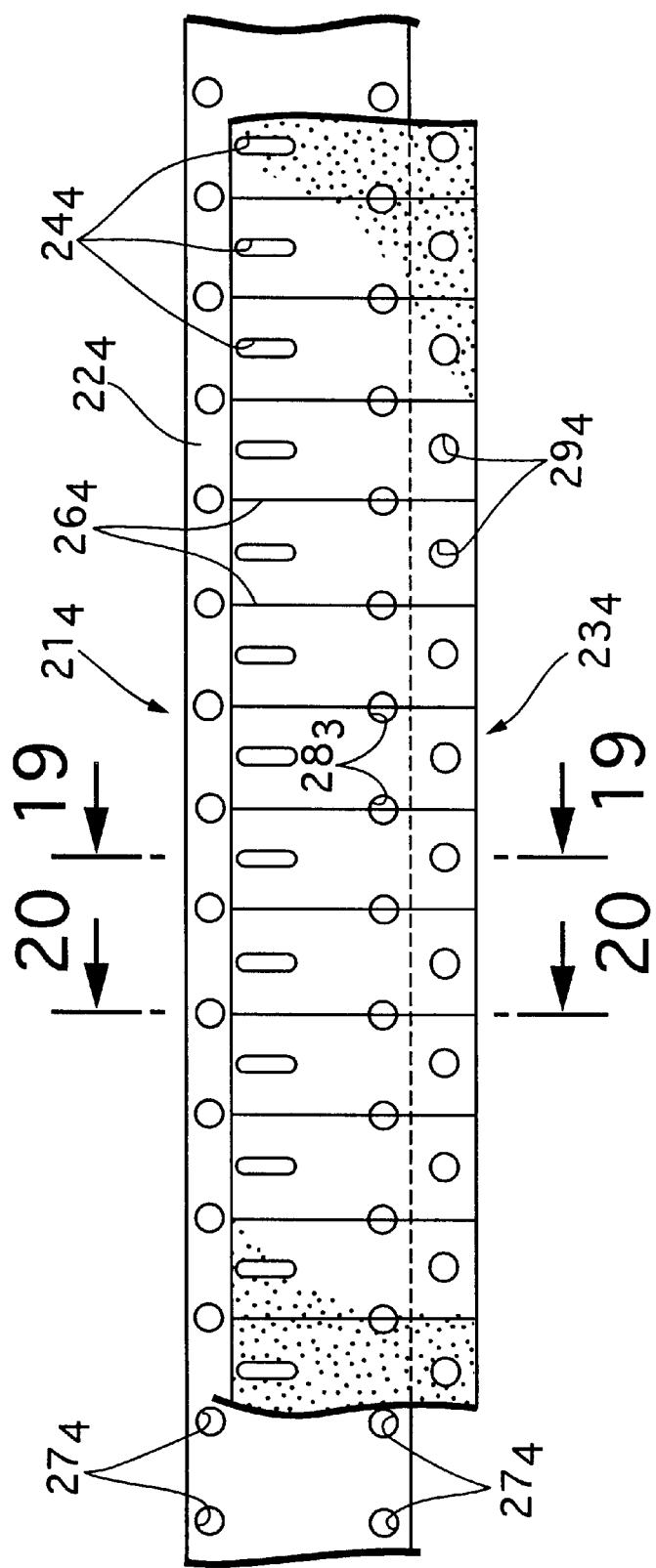
FIG. 18 is a side view of a seedling raising sheet according to a fourth embodiment of the present invention.
Figure 19:
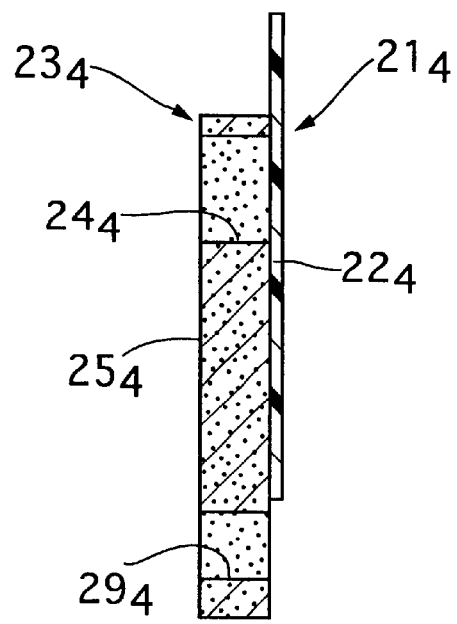
FIG. 19 is an enlarged sectional view taken along a line 19—19 in FIG. 18.
Figure 20:
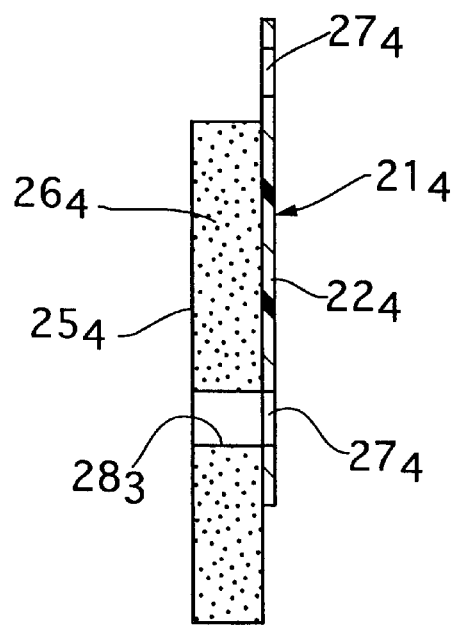
FIG. 20 is an enlarged sectional view taken along a line 20—20 in FIG. 18.

FIGS. 18 to 20 illustrate a fourth embodiment of the present invention. FIG. 18 is a side view of a seedling raising sheet; FIG. 19 is an enlarged sectional view taken along a line 19—19 in FIG. 18; and FIG. 20 is an enlarged sectional view taken along a line 20—20 in FIG. 18.

The seedling raising sheet $21_4$ includes a support band $22_4$ extending with its widthwise direction being vertical, and a porous sheet $23_4$ having open cells. The support band $22_4$ and the porous sheet $23_4$ are bonded to each other, so that the porous sheet $23_4$ can be peeled off from the support band $22_4$.

The porous sheet $23_4$ is bonded to the support band $22_4$ in such a manner that a lower portion of the porous sheet $23_4$ protrudes from a lower end of the support band $22_4$. Moreover, longitudinally long accommodating recesses $24_4$ for accommodating seedling seeds, e.g., rice seeds of a paddy are provided in an upper portion of the porous sheet $23_4$, and slits $26_4$ enabling the porous sheet $23_4$ to be separated into a plurality of sheet pieces $25_4$ are provided in the porous sheet $23_3$ over the widthwise, i.e., vertically entire length of the latter at locations substantially equally spaced apart in the lengthwise direction of the porous sheet $23_4$ in such a manner that each of the slits $26_4$ is located halfway between the adjacent accommodating recesses $24_4$. In addition, circular feed bores $27_3$ for feeding the support band $22_4$ in the lengthwise direction thereof are provided in one row in each of upper and lower portions of the support band $22_4$ in such a manner that they correspond to the slits $26_4$. Bores $28_3$ corresponding to the feed bores $27_4$ provided in the lower portion of the support band $22_4$ are provided in a lower portion of the porous sheet $23_4$.

Circular claw hooking bores $29_4$ are provided in a lower end of the porous sheet $23_4$ protruding from the lower end of the support band $22_4$ at locations substantially corresponding to the accommodating recesses $24_4$, so that the needle 66 (see FIG. 12) of the transplanting claw 65 is brought into engagement in the claw hooking bore $29_4$.

In the raising and transplantation of seedlings using such seedling raising sheet $21_4$, the seedling raising sheet $21_4$ is rolled with the porous sheet $23_4$ being located on the side of an inner periphery thereof. Thus, it is possible to provide an effect similar to that in the first or second embodiment.

Figure 21:
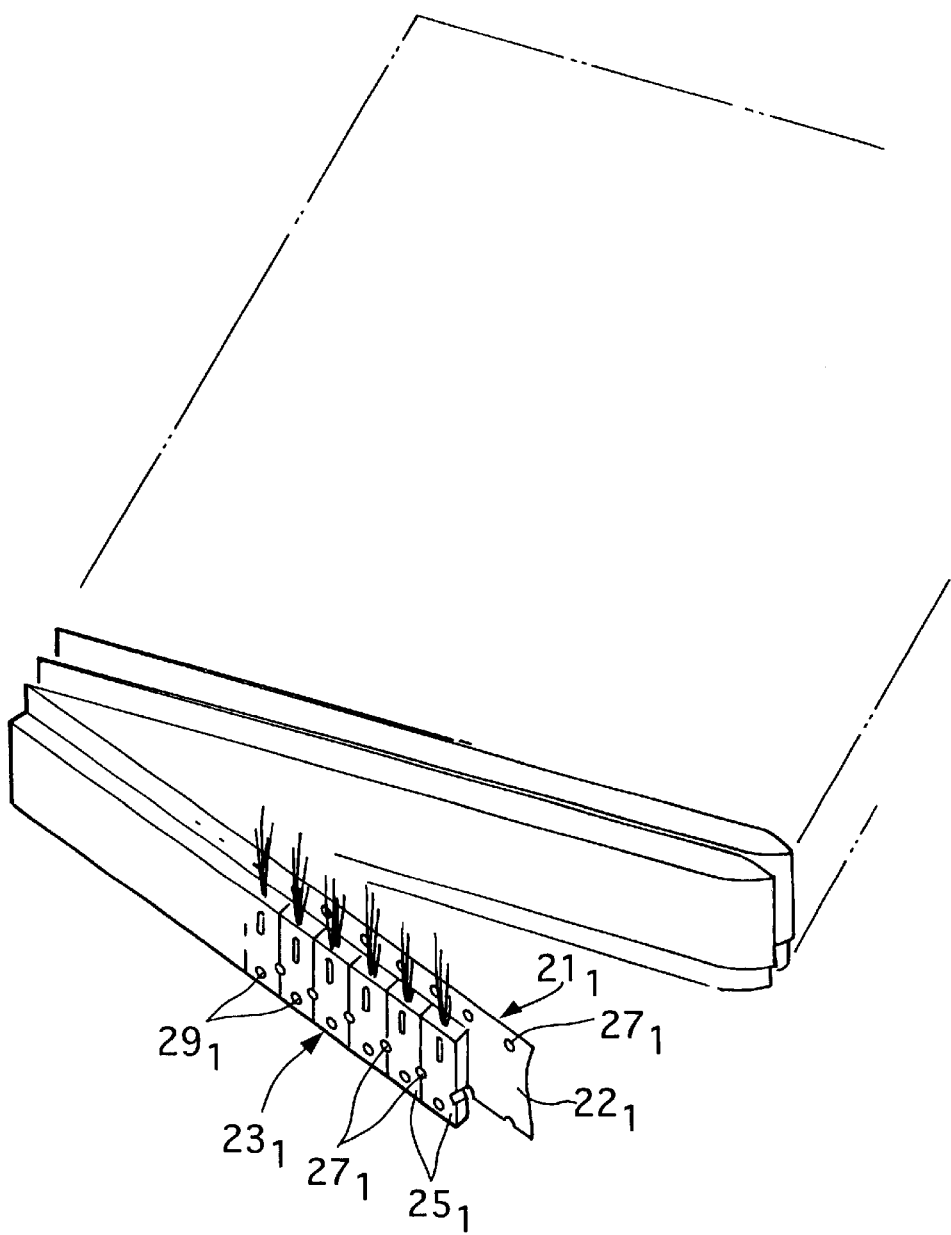
FIG. 21 is a perspective view of a seedling raising sheet according to a fifth embodiment of the present invention.

In a fifth embodiment of the present invention, the seedling raising sheet $21_1, 21_2, 21_3$ or $21_4$ may be formed so that it may be folded in a zigzag fashion in which the entire sheet assumes a rectangular shape, in the raising and transplantation of seedlings, as shown in FIG. 21. In this case, if the seedling raising sheet $21_1, 21_2, 21_3$ or $21_4$ remains folded in the zigzag fashion, the porous sheets $23_1, 23_2, 23_3$ or $23_4$ remain in mutual contact. Therefore, a sheet-like shielding member made of a paper or a synthetic resin may be sandwiched between the porous sheets $23_1, 23_2, 23_3$ or $23_4$, so that roots of seedlings are prevented from being tangled during raising of the seedlings.

Figure 22:
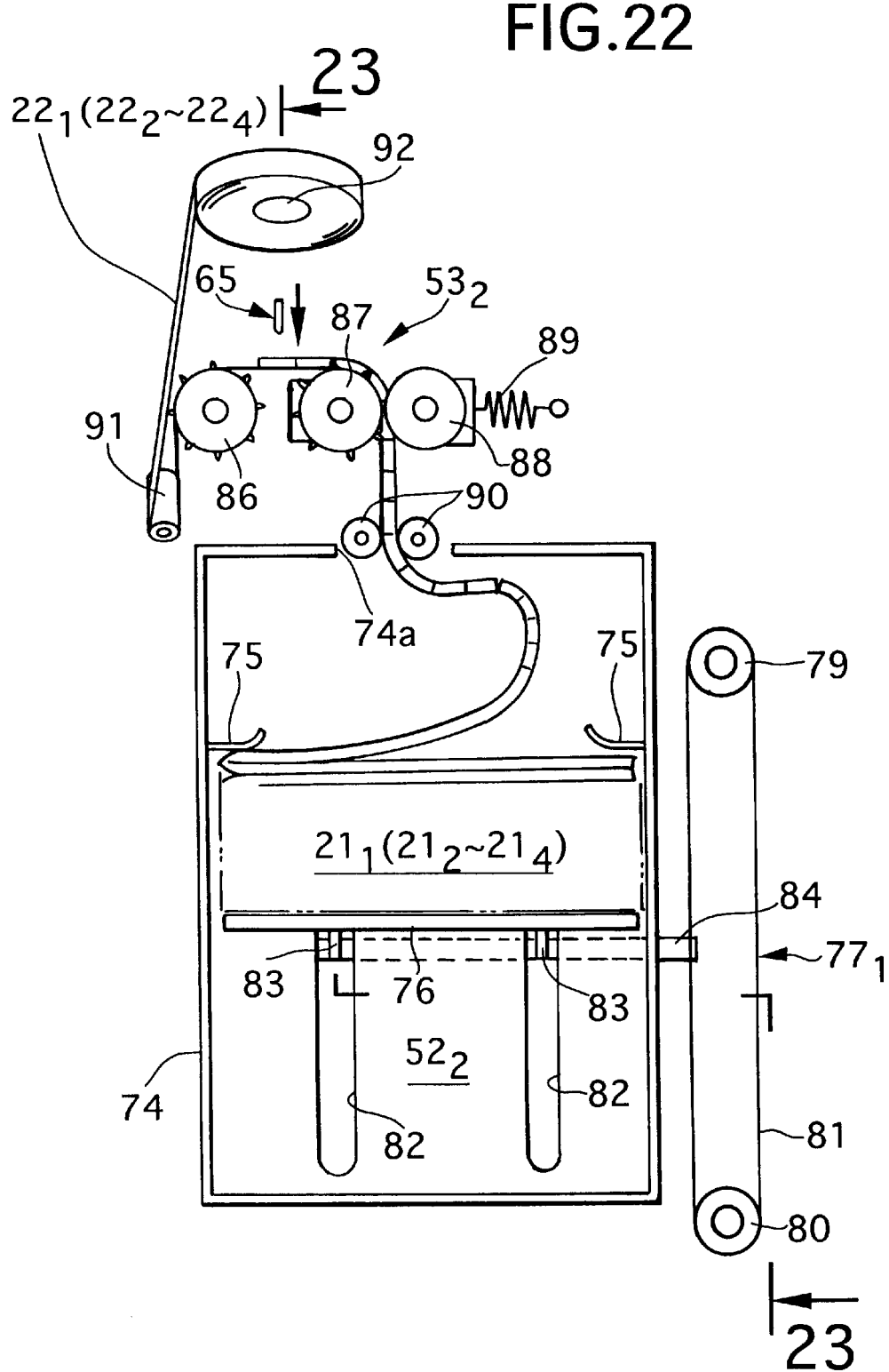
FIG. 22 is a schematic plan view of a transplanting stand and a feed mechanism applied to the seedling raising sheet shown in FIG. 21.
Figure 23:
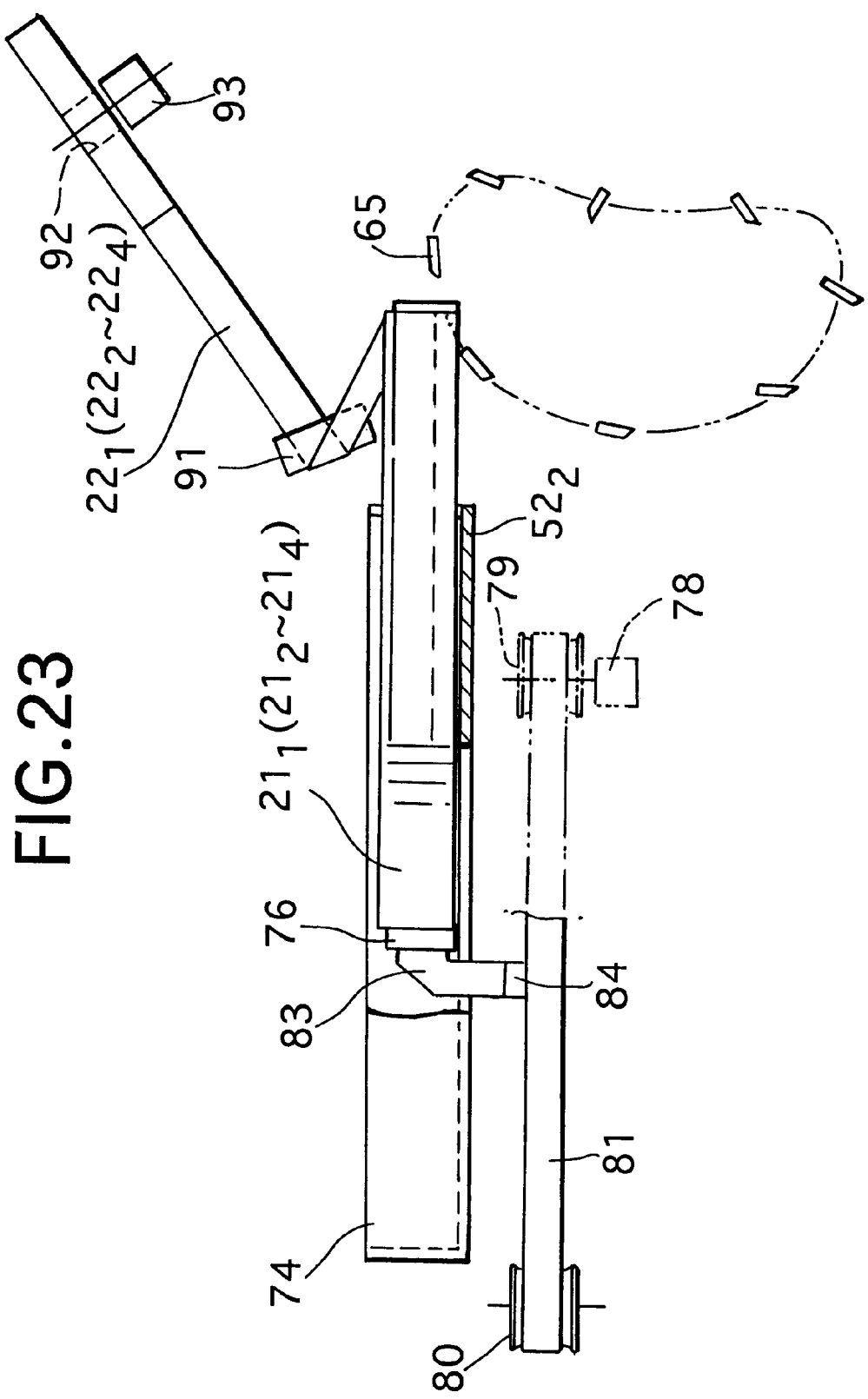
FIG. 23 is a sectional view taken along a line 23—23 in FIG. 22.

When a rice planting is carried out by use of such seedling raising sheet $21_1, 21_2, 21_3$ or $21_4$, for example, a transplanting stand $52_2$ and a feed mechanism $53_2$ as shown in FIGS. 22 and 23 are mounted in a rice planting machine.

In FIGS. 22 and 23, the transplanting stand $52_2$ is formed into a rectangular box-like configuration having a wall 74 on a peripheral edge thereof, and the seedling raising sheet $21_1, 21_2, 21_3$ or $21_4$ folded in a rectangular shape is placed onto the transplanting stand $52_2$. An opening 74a for pulling out the seedling raising sheet $21_1, 21_2, 21_3$ or $21_4$ from the transplanting stand $52_2$ is provided in the wall 74 at a front end of the transplanting stand $52_2$. Limiting portions 75, 75 are provided at a longitudinally intermediate portion of the transplanting stand $52_2$ for limiting the position of a front end of the seedling raising sheet $21_1, 21_2, 21_3$ or $21_4$ on the transplanting stand $52_2$ by engagement with opposite sides of the front end of the seedling raising sheet $21_1, 21_2, 21_3$ or $21_4$ folded in the rectangular shape. A sheet pusher 76 is provided to abut against a rear end of the seedling raising sheet $21_1, 21_2, 21_3$ or $21_4$ folded in the rectangular shape. The sheet pusher 76 is driven in a longitudinal direction on the transplanting stand $52_2$ by a stocker feeding mechanism $77_1$.

The stocker feeding mechanism $77_1$ is disposed sideways of the transplanting stand $52_2$ and includes a driving pulley 79 driven in rotation by a motor 78, a follower pulley 80 freely rotated at a location spaced apart rearwards from the driving pulley 79, and an endless belt 81 reeved around the driving and follower pulleys 79 and 80. The driving and follower pulleys 79 and 80 are disposed with their rotational axes being vertical.

A pair of guide bores 82, 82 are provided in the transplanting stand $52_2$ to extend in a longitudinal direction of the transplanting stand $52_2$. Connecting plates 83, 83 vertically passing through the guide bores 82, 82 are secured to the sheet pusher 76 and fixedly connected at their lower ends to a moving plate 84 firmly fastened to the belt 81.

Therefore, the belt 81 and thus the moving plate 84 can be driven to travel longitudinally of the transplanting stand $52_2$ by the motor 78, thereby driving the seedling raising sheet $21_1, 21_2, 21_3$ or $21_4$ in the longitudinal direction on the transplanting stand $52_2$ by the sheet pusher 76.

The feed mechanism $53_2$ includes a driving sprocket 86 meshed in the two rows of upper and lower feed bores $27_1, 27_2, 27_3$ or $27_4$ provided in the seedling raising sheet $21_1, 21_2, 21_3$ or $21_4$, a follower sprocket 87 adapted to apply a tension to the seedling raising sheet $21_1, 21_2, 21_3$ or $21_4$ to eliminate a looseness by the cooperation with the driving sprocket 86, a roller 88 adapted to sandwich the seedling raising sheet $21_1, 21_2, 21_3$ or $21_4$ between the roller 88 itself and the follower sprocket 87, and a spring 89 for biasing the roller 88 toward the follower sprocket 87. A transplanting claw 65 is disposed between the driving and follower sprockets 86 and 87. A pair of attitude maintaining rollers 90, 90 are disposed at locations corresponding to the opening 74a in the transplanting stand $52_2$ for preventing the falling-down of the seedling raising sheet $21_1, 21_2, 21_3$ or $21_4$ by sandwiching the seedling raising sheet $21_1, 21_2, 21_3$ or $21_4$ therebetween from opposite sides.

The support band $22_1, 22_2, 22_3$ or $22_4$ from which the sheet piece $25_1, 25_2, 25_3$ or $25_4$ has been peeled off by the transplanting claw 65 and which has been fed from the driving sprocket 86 is wound around a guide roller 91 inclined rearwards and further wound around a support band take-up roller 92 which is inclined forwards and driven by a motor 93.

If the seedling raising sheet $21_1$, $21_2$, $21_3$ or $21_4$ is fed by such construction, the seedling raising sheet $21_1$, $21_2$, $21_3$ or $21_4$ can be replenished into an occupied space in the transplanting stand $52_2$ produced as the seedling raising sheet $21_1$, $21_2$, $21_3$ or $21_4$ is fed during transplantation using the transplanter such as the rice planting machine, thereby facilitating the replenishment of seedlings by the transplanting stand $52_2$.

Figure 24:
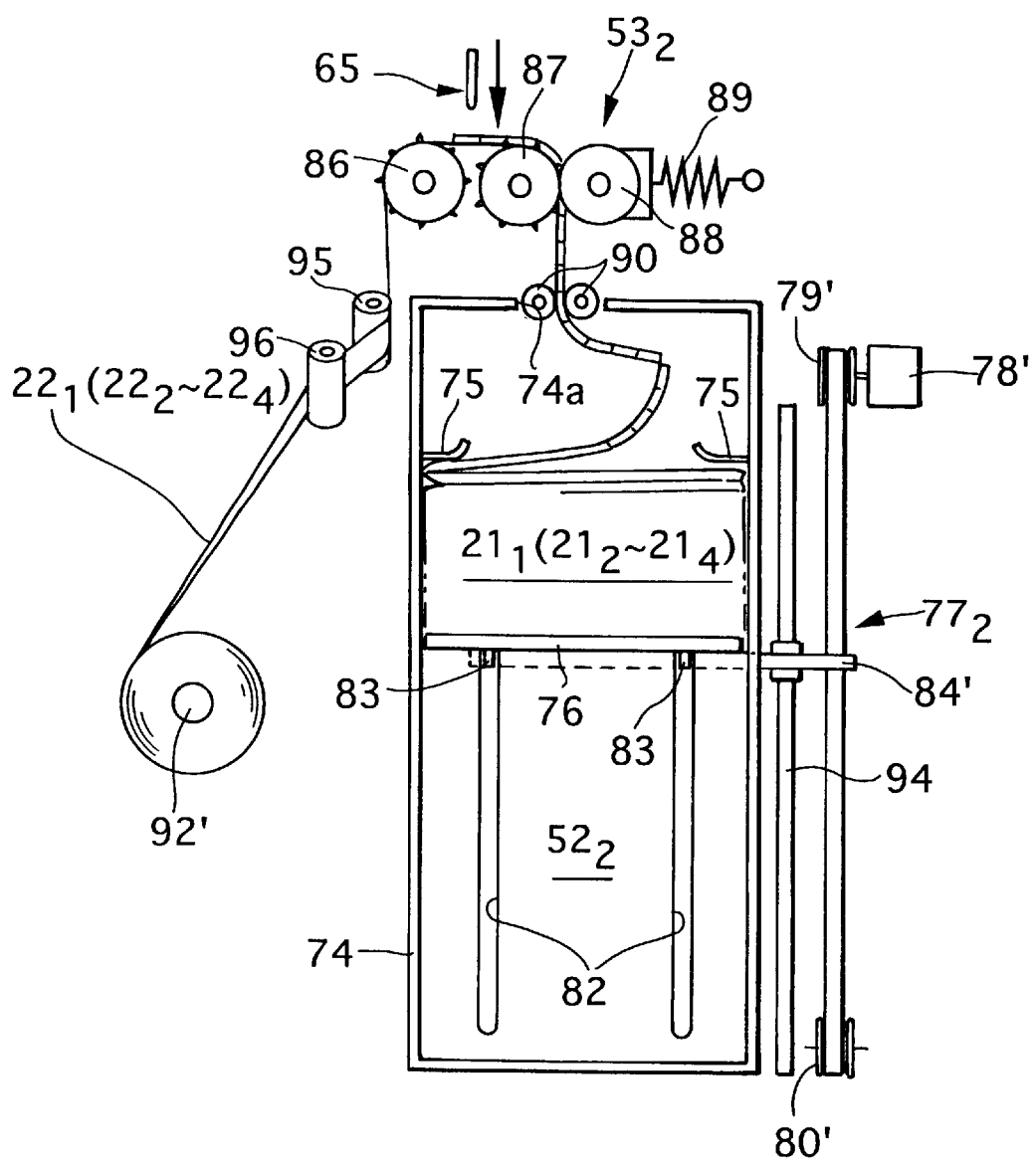
FIG. 24 is a plan view similar to FIG. 22, but illustrating modifications of a stocker feeding mechanism and a support band winding section.

FIG. 24 illustrates modifications to the stocker feed mechanism and the support band winding section. A stocker feed mechanism $77_2$ includes a driving pulley 79' driven in rotation by a motor 78', a follower pulley 80' freely rotated at a location spaced apart rearwards from the driving pulley 79', and an endless belt 81' reeved around the driving and follower pulleys 79' and 80'. The driving and follower pulleys 79' and 80' are disposed with their rotational axes being substantially horizontal.

The connection plates 83, 83 extending through the guide bores 82, 82 in the transplanting stand $52_2$ and secured to the sheet pusher 76 are fixedly connected to a moving plate 84' fixedly fastened to a belt 81'. The longitudinal movement of the moving plate 84' is guided by a stationary guide rod 94 extending longitudinally sideways of the transplanting stand $52_2$.

The support band $22_1$, $22_2$, $22_3$ or $22_4$ from which the sheet piece $25_1$ or $25_2$ has been peeled off by the transplanting claw 65 and which has been fed from the driving sprocket 86 is wound sequentially around guide rollers 95 and 96 inclined forwards and wound around a support band take-up roller 92' having a vertically extending axis.

The power from the engine 48 may be transmitted to the driving sprocket 86 and the support band take-up roller 92, 92' through the endless transmitting mechanism such as a sprocket used for driving the driving sprocket 55 and the support band take-up roller 59 in FIGS. 10 and 11, in place of the motor for the driving sprocket 86 as well as the motor 93 for the support band take-up roller 92, 92' in FIGS. 22 to 24. In addition, the motor 78, 78' for the stocker feed mechanism $77_1$, $77_2$ may be replaced by a transmitting mechanism operatively connected to the planting mechanism 60 shown in FIGS. 10 and 11.

Figure 25:
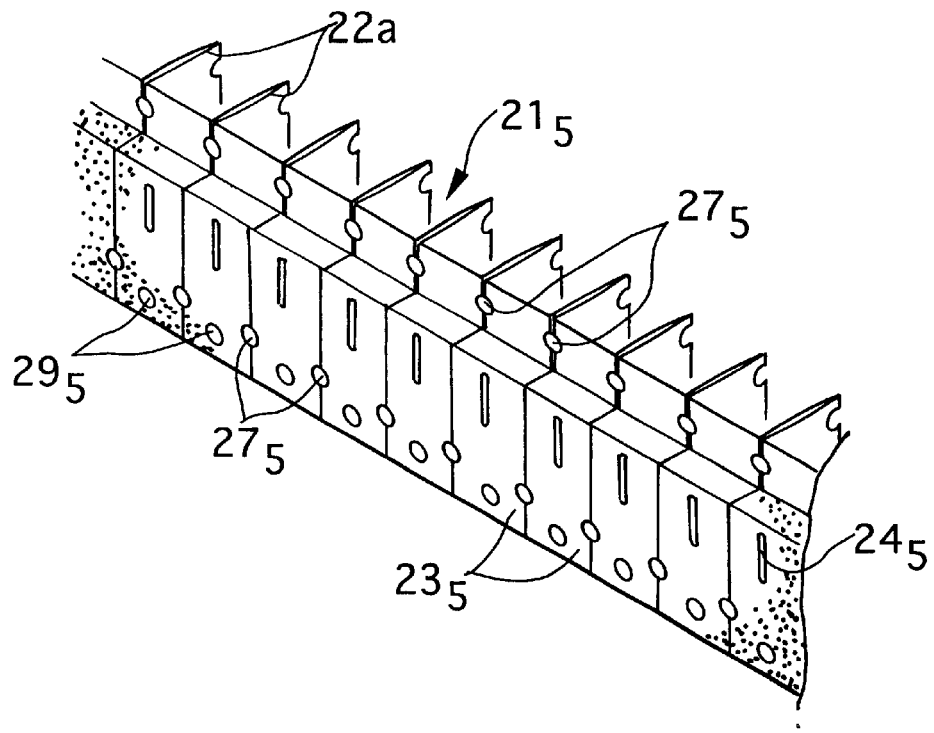
FIG. 25 is a side view of a seedling raising sheet according to a sixth embodiment of the present invention.
Figure 26:
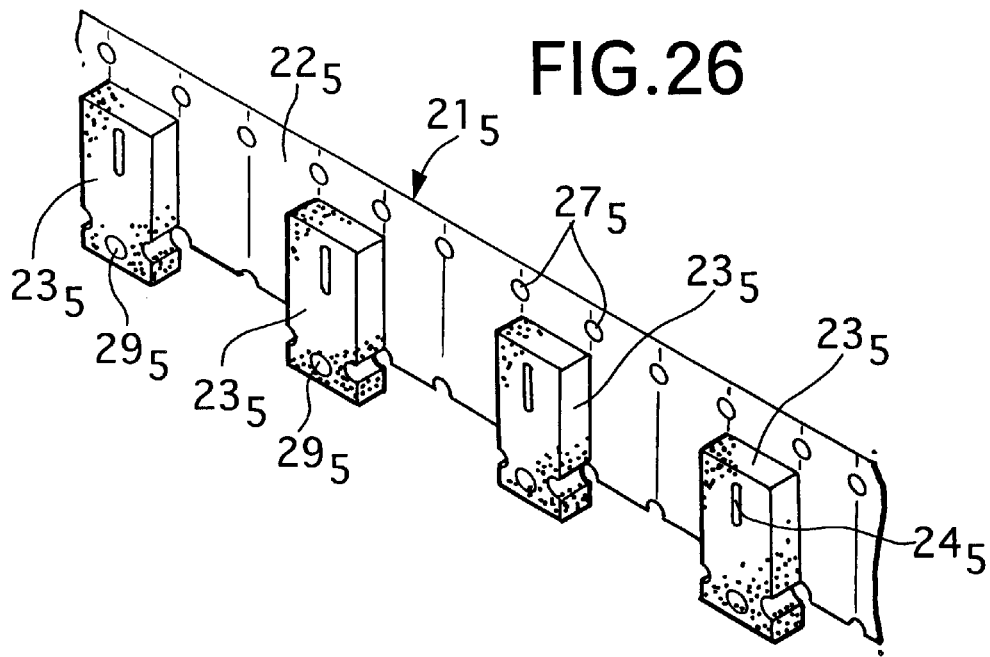
FIG. 26 is a perspective view of the seedling raising sheet in its unfolded state.

FIGS. 25 and 26 illustrate a sixth embodiment of the present invention. FIG. 25 is a perspective view of a seedling raising sheet, and FIG. 26 is a perspective view illustrating the seedling raising sheet shown in FIG. 25 in its unfolded state.

The seedling raising sheet $21_5$ includes a support band $22_5$ extending with its widthwise direction being vertical, and porous sheets $23_5$ having open cells. The support band $22_5$ and the porous sheets $23_5$ are bonded to each other, so that the porous sheets $23_5$ can be peeled off from the support band $22_5$.

The porous sheets $23_5$ are each formed into a shape substantially equivalent to that of the sheet piece $25_1$ in the first embodiment and are bonded to the support band $22_5$ in such a manner that they are spaced apart at equal distances from one another. Thus, the slits $26_1$ provided in the porous sheet $23_1$ in the above-described embodiment are not required. Each of the porous sheets $23_5$ is provided with an accommodating recess $24_5$ located in proximity to an upper end of the porous sheet $23_5$, and a claw hooking bore $29_5$ located below the accommodating recess $24_5$.

Feed bores $27_5$, for example, of a circular shape for feeding the support band $22_5$ in the lengthwise direction thereof are provided in one row in each of upper and lower portions of the support band $22_5$. The distance between the adjacent feed bores $27_5$, $27_5$ is set at ½ of the distance between the porous sheets $23_5$, $23_5$ disposed in the adjacent locations.

In the raising and transplantation of seedlings, such seedling raising sheet $21_5$ is folded as shown in FIG. 25. That is, the support band $22_5$ in the seedling raising sheet $21_5$ is folded at fold-back portions 22a each corresponding to an intermediate portion between the adjacent porous sheets $23_5$, $23_5$. In the raising and transplantation of seedlings, such seedling raising sheet $21_5$ is rolled or folded in a zigzag fashion as in the fifth embodiment shown in FIG. 21. In this case, even in the folded state, positions of the feed bores $27_5$, $27_5$ can be aligned, thereby feeding the seedling raising sheet $21_5$ in the lengthwise direction.

Such seedling raising sheet $21_5$ can be rolled or folded in the zigzag fashion in the raising and transplantation of seedlings, thereby enabling the raising and transplantation of seedlings using a seedling raising equipment and a transplanter similar to those in each of the above-described embodiments. However, the distances between the adjacent porous sheet $23_5$ can be substantially uniformized and hence, even if the seedling raising sheet $21_5$ can be planted directly into the ground in a state in which seedling seeds have been accommodated in the accommodating recesses $24_5$ to conduct a direct-sowing culture, the distances between stocks can be maintained substantially constant. As a result, the transplanter is not required, and the seedling raising equipment is also not required, thereby making it possible to provide a considerable reduction in cost.

Although the embodiments of the present invention have been described in detail, it will be understood that the present invention is not limited to the above-described embodiments, and various modifications may be made without departing from the spirit and scope of the invention defined in claims.

For example, the accommodating recess is not limited to the elliptic shape and the slit-like shape, and may be of any shape such as a polygonal shape. The claw hooking bore is also not limited to the circular and elliptic shapes and may be of any shape such as rectangular and polygonal shapes and a slit-like shape. The feeding lock portion for feeding the support band is not limited to the feed bore and may be a rugged portion. In place of insertion of the shielding members into the slits, opposite sides of the sheet piece may be fired. The transmitting and driving system of the transplanter is not limited to the construction in the above-described embodiments, and various transmitting paths are considered.

In addition, in the raising of seedlings, the seedling raising sheet $21_1$, $21_2$, $21_3$, $21_4$ or $21_5$ may be rolled with the porous sheet $23_1$, $23_2$, $23_3$, $23_4$ or $23_5$ being located on the side of the inner periphery thereof, and in the transplantation, the seedling raising sheet $21_1$, $21_2$, $21_3$, $21_4$ or $21_5$ may be rerolled so that the porous sheet $23_1$, $23_2$, $23_3$, $23_4$ or $23_5$ is located on the side of the outer periphery thereof. In this case, it is possible to avoid the dropping of seedling seeds from the accommodating recesses during raising of seedlings and to easily confirm the presence and absence of seedlings at the time of transplantation to perform a reliable transplantation. Reversely, in the raising of seedlings, the seedling raising sheet $21_1$, $21_2$, $21_3$, $21_4$ or $21_5$ may be rolled with the porous sheet $23_1$, $23_2$, $23_3$, $23_4$ or $23_5$ being located on the side of the outer periphery thereof, and in the transplantation, the seedling raising sheet $21_1$, $21_2$, $21_3$, $21_4$ or $21_5$ may be rerolled so that the porous sheet $23_1$, $23_2$, $23_3$, $23_4$ or $23_5$ is located on the side of the inner periphery thereof.

Further, in the above-described embodiments, the seedling seeds are accommodated one by one in the accommodating recesses $24_1$, $24_2$, $24_3$, $24_4$ or $24_5$, but a plurality of seedling seeds may be accommodated in each of the accommodating recesses $24_1$, $24_2$, $24_3$, $24_4$ or $24_5$.

What is claimed is:

1. A seedling raising sheet comprising a porous sheet having open cells and attached to one surface of a thin support band extending in a band-like configuration with its widthwise direction being an up-and-down direction, said porous sheet being provided with accommodating recesses for accommodating seedling seeds, wherein said porous sheet has a claw hooking bore provided in a lower portion thereof for engagement with a transplanting claw in the transplantation, and feed lock portions provided in at least one row for feeding the support band in a lengthwise direction thereof.

2. A seedling raising sheet according to claim 1, wherein said feed lock portions are provided in both of upper and lower portions of said support band.

3. A seedling raising sheet according to claim 1, further including slits which are provided in the porous sheet at locations substantially equally spaced apart in a lengthwise direction of the porous sheet to extend long in an up-and-down direction, said slits enabling the porous sheet formed into a band-like shape to be separated into a plurality of sheet pieces.

4. A seedling raising sheet according to claim 3, further including feed lock portions that feed said support band in the lengthwise direction thereof are provided in the support band at locations substantially corresponding to said slits in the lengthwise direction of the support band.

5. Seedling raising sheet according to claim 3, further including shielding members disposed in said slits for demarcating the sheet pieces on opposite sides of the slit.

6. A seedling raising sheet according to claim 1, wherein said porous sheet has a lower end protruding from a lower end of said support band.

7. A seedling raising sheet according to claim 1, wherein said accommodating recesses are provided in an upper portion of said porous sheet.

8. A seedling raising sheet according to claim 7, wherein upper ends of said accommodating recesses are disposed in proximity to an upper end of said porous sheet, or open at the upper end of said porous sheet.

9. A seedling raising sheet according to claim 1, wherein said accommodating recesses are formed into a shape which permits seedling seeds accommodated in the accommodating recesses to assume an attitude directed substantially in an up-and-down direction or substantially horizontally.

10. A seedling raising sheet according to claim 1, wherein said seedling raising sheet is rolled in the raising and transplantation of seedlings.

11. A seedling raising sheet according to claim 10, wherein said porous sheet is disposed on the side of an outer periphery of said seedling raising sheet.

12. A seedling raising sheet according to claim 10, wherein said porous sheet is disposed on the side of an inner periphery of said seedling raising sheet.

13. A seedling raising sheet according to claim 1, wherein said seedling raising sheet is folded in a zigzag fashion into a rectangular shape as a whole in the raising and transplantation of seedlings.

14. A seedling raising sheet according to claim 1, wherein said porous sheet has a lower end protruding from a lower end of said support band, and said claw hooking bore has at least a portion thereof disposed below the lower end of said support band.

15. A cultivating process comprising directly planting said seedling raising sheet according to claim 1 into the ground in a state in which seedling seeds have been accommodated in the accommodating recesses in said seedling raising sheet to conduct a direct sowing cultivation.

16. A process for producing the seedling raising sheet according to claim 1, comprising the steps of:

producing a continuous block of a porous material having open cells;

milling said block into a thickness of 3 to 10 mm to provide a porous sheet;

bonding a support band and said porous sheet to each other; and stamping said porous sheet to form a plurality of accommodating recesses in said porous sheet.

17. A process for producing a seedling raising sheet according to claim 16, wherein portions of abutting surfaces of said support band and said porous sheet are bonded to each other at the step of bonding said support band and said porous sheet to each other.

18. A seedling raising process comprising raising seedling seeds accommodated in the accommodating recesses in said seedling raising sheet according to any of claims 10 to 13 by a hydroponic culture.

19. A transplanter comprising, a transplanting stand on which the seedling raising sheet according to claim 1 is placed;

a feed mechanism for delivering said seedling raising sheet from on said transplanting stand; and a planting mechanism for peeling off a porous sheet from a support band of said seedling raising sheet delivered by said feed mechanism to plant said porous sheet into the ground.

20. A transplanter comprising a planting mechanism which is operated to bring the transplanting claw into engagement with the claw hooking bore in the seedling raising sheet according to claim 1 or 15 from the side of said support band to peel off said porous sheet from said support band.

* * * * *